(12) United States Patent
Heuft et al.

(10) Patent No.: US 8,859,171 B2
(45) Date of Patent: Oct. 14, 2014

(54) CHARGE TRANSPORT PARTICLES

(75) Inventors: Matthew A. Heuft, Oakville (CA); Adrien Pierre Coté, Clarkson (CA)

(73) Assignee: Xerox Corporation, Norwalk, CT (US)

( * ) Notice: Subject to any disclaimer, the term of this patent is extended or adjusted under 35 U.S.C. 154(b) by 590 days.

(21) Appl. No.: 12/717,077

(22) Filed: Mar. 3, 2010

(65) Prior Publication Data

US 2011/0217642 A1 Sep. 8, 2011

(51) Int. Cl.
*G03G 5/04* (2006.01)
*G03G 5/06* (2006.01)

(52) U.S. Cl.
CPC ............... *G03G 5/04* (2013.01); *Y02E 10/549* (2013.01); *G03G 5/06* (2013.01)
USPC ........................................ 430/58.05; 430/56

(58) Field of Classification Search
USPC ................................ 430/58.05, 56
See application file for complete search history.

(56) References Cited

U.S. PATENT DOCUMENTS

| | | | |
|---|---|---|---|
| 4,265,990 A | 5/1981 | Stolka et al. | |
| 4,286,033 A | 8/1981 | Neyhart et al. | |
| 4,291,110 A | 9/1981 | Lee | |
| 4,338,387 A | 7/1982 | Hewitt | |
| 4,464,450 A | 8/1984 | Teuscher | |
| 4,544,618 A * | 10/1985 | Kopko | 430/123.43 |
| 4,664,995 A | 5/1987 | Horgan et al. | |
| 4,921,769 A | 5/1990 | Yuh et al. | |
| 4,921,773 A | 5/1990 | Melnyk et al. | |
| 5,853,906 A | 12/1998 | Hsieh | |
| 6,020,426 A * | 2/2000 | Yamaguchi et al. | 525/66 |
| 7,202,002 B2 | 4/2007 | Tokarski et al. | |
| 7,416,824 B2 | 8/2008 | Kondoh et al. | |

* cited by examiner

*Primary Examiner* — Mark F Huff
*Assistant Examiner* — Rachel Zhang
(74) *Attorney, Agent, or Firm* — Pillsbury Winthrop Shaw Pittman LLP

(57) ABSTRACT

A charge transport particle comprising a plurality of segments and a plurality of linkers arranged as a covalent organic framework, wherein at a macroscopic level the covalent organic framework is a particle that has electroactive added functionality.

14 Claims, 5 Drawing Sheets

CHARGE TRANSPORT PARTICLES

BACKGROUND

Materials whose chemical structures are comprised of molecules linked by covalent bonds into extended structures can be placed into two classes: (1) polymers and cross-linked polymers, and (2) covalent organic frameworks (also known as covalently linked organic networks).

The first class, polymers and cross-linked polymers, is typically embodied by polymerization of molecular monomers to form long linear chains of covalently-bonded molecules. Polymer chemistry processes can allow for polymerized chains to, in turn, or concomitantly, become 'cross-linked.' The nature of polymer chemistry offers poor control over the molecular-level structure of the formed material, e.g. the organization of polymer chains and the patterning of molecular monomers between chains is mostly random. Nearly all polymers are amorphous, save for some linear polymers that efficiently pack as ordered rods. Some polymer materials, notably block co-polymers, can possess regions of order within their bulk. In the two preceding cases the patterning of polymer chains is not by design, any ordering at the molecular-level is a consequence of the natural intermolecular packing tendencies.

The second class, covalent organic frameworks (COFs), differ from the first class (polymers/cross-linked polymers) in that COFs are intended to be highly patterned. In COF chemistry, molecular components are called molecular building blocks rather than monomers. During COF synthesis molecular building blocks react to form two- or three-dimensional networks. Consequently, molecular building blocks are patterned throughout COF materials and molecular building blocks are linked to each other through strong covalent bonds.

COFs developed thus far are typically powders with high porosity and are materials with exceptionally low density. COFs can store near-record amounts of argon and nitrogen. While these conventional COFs are useful, there is a need, addressed by the present embodiments, for new materials based on COFs that offer advantages over conventional COFs in terms of enhanced characteristics.

The following documents provide background information and are hereby incorporated by reference: Yaghi et al., US Patent Application Publication No. 2006/0154807 A1; Yaghi et al., U.S. Pat. No. 7,196,210 B2; Shun Wan et al., "A Belt-Shaped, Blue Luminescent, and Semiconducting Covalent Organic Framework," Angew. Chem. Int. Ed., Vol. 47, pp. 8826-8830 (published on web Jan. 10, 2008); Nikolas A. A. Zwaneveld et al., "Organized Formation of 2D Extended Covalent Organic Frameworks at Surfaces," J. Am. Chem. Soc., Vol. 130, pp. 6678-6679 (published on web Apr. 30, 2008); Adrien P. Cote et al., "Porous, Crystalline, Covalent Organic Frameworks," Science, Vol. 310, pp. 1166-1170 (Nov. 18, 2005); Hani El-Kaderi et al., "Designed Synthesis of 3D Covalent Organic Frameworks," Science, Vol. 316, pp. 268-272 (Apr. 13, 2007); Adrien P. Cote et al., "Reticular Synthesis of Microporous and Mesoporous Covalent Organic Frameworks" J. Am. Chem. Soc., Vol. 129, 12914-12915 (published on web Oct. 6, 2007); Omar M. Yaghi et al., "Reticular synthesis and the design of new materials," Nature, Vol. 423, pp. 705-714 (Jun. 12, 2003); Nathan W. Ockwig et al., "Reticular Chemistry: Occurrence and Taxonomy of Nets and Grammar for the Design of Frameworks," Acc. Chem. Res., Vol. 38, No. 3, pp. 176-182 (published on web Jan. 19, 2005); Pierre Kuhn et al., 'Porous, Covalent Triazine-Based Frameworks Prepared by Ionothermal Synthesis," Angew. Chem. Int. Ed., Vol. 47, pp. 3450-3453. (Published on web Mar. 10, 2008); Jia-Xing Jiang et al., "Conjugated Microporous Poly(aryleneethylnylene) Networks," Angew. Chem. Int. Ed., Vol. 46, (2008) pp, 1-5 (Published on web Sep. 26, 2008); and Hunt, J. R. et al. "Reticular Synthesis of Covalent-Organic Borosilicate Frameworks" J. Am. Chem. Soc., Vol. 130, (2008), 11872-11873. (published on web Aug. 16, 2008).

SUMMARY OF THE DISCLOSURE

According to aspects illustrated herein, there is provided a charge transport particle comprising a plurality of segments and a plurality of linkers arranged as a covalent organic framework, wherein the charge transport particle has an added functionality of electron, hole, or ambipolar charge transport.

In other embodiments, there is provided a charge transport particle comprising a plurality of segments and a plurality of linkers arranged as a covalent organic framework, wherein the segments comprise charge transport moieties.

In yet further embodiments, there is provided an electronic device comprising: a charge transport particle comprising a plurality of segments and a plurality of linkers arranged as a covalent organic framework, wherein the segments comprise charge transport moieties.

BRIEF DESCRIPTION OF THE DRAWINGS

Other aspects of the present embodiments will become apparent as the following description proceeds and upon reference to the following figures which represent illustrative embodiments.

Unless otherwise noted, the same reference numeral in different Figures refers to the same or similar feature.

DETAILED DESCRIPTION

Figure 1:
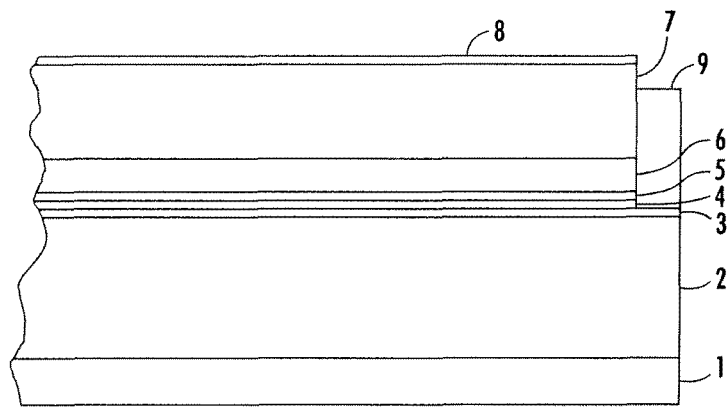
FIG. 1 represents a simplified side view of a first embodiment of the inventive photoreceptor.

The present embodiments are directed to covalent organic frameworks (COFs) that are in the form of particles at a macroscopic level, and more specifically, use of the COFs as a novel charge transport particle. Reference to the term "COFs" in the following description refers to COF in particle form. The phrase "macroscopic level" refers to the naked eye view of the present COFs.

The present embodiments disclose the composition of a charge transport particle comprising a plurality of segments and a plurality of linkers arranged as a covalent organic framework, wherein at a macroscopic level the covalent organic framework is a particle composed of a two- or three-dimensional network formed from multiple segments. In specific embodiments, the particles are comprised of a plurality of N,N,N',N'-tetraphenyl]-biphenyl-4,4'-diamine segments. These 5 nanometers to 1 millimeter-sized particles are patterned in two- or three-dimensions.

In further embodiments, the structured organic particles constructed from hole transport or electron transport molecules and used as charge transport materials in organic electronic layers, for example, xerographic, solar cell, organic light-emitting diode (OLED), and thin-film transistor (TFT), or as additives to alter the mechanical properties of an organic electronic film or material.

Molecular Building Block

A molecular building block comprises a segment (S) and functional groups (Fg). Molecular building blocks require at least two functional groups (x≥2) and may comprise a single type or two or more types of functional group. Functional groups are the reactive chemical moieties of molecular building blocks that participate in a chemical reaction to link together segments during the COF particle forming process. A segment is the portion of the molecular building block which supports functional groups and comprises all atoms which are not associated with functional groups. Further, the composition of a molecular building block segment remains unchanged after COF particle formation.

Functional Group

Functional groups are the reactive chemical moieties of molecular building blocks that participate in a chemical reaction to link together segments during the COF particle forming process. Functional groups can be composed of a single atom, or functional groups can be composed of more than one atom. The atomic compositions of functional groups are those compositions normally associated with reactive moieties in chemical compounds. Non-limiting examples of functional groups include halogens, alcohols, ethers, ketones, carboxylic acids, esters, carbonates, amines, amides, amines, ureas, aldehydes, isocyanates, tosylates, alkenes, alkynes and the like.

Molecular building blocks contain a plurality of chemical moieties, but a only subset of these chemical moieties are intended to be functional groups during the COF particle forming process. Whether or not a chemical moiety is considered a functional group depends on the reaction conditions selected for the COF particle forming process. Functional groups, indicated by the abbreviation Fg, in the drawing above, and functional groups (Fg) indicated heretofore in embodiments denote a chemical moiety that is a reactive moiety, that is, a functional group during the COF particle forming process.

In the COF particle forming process the composition of a functional group will be altered through the loss of atoms, the gain of atoms, or both the loss and the gain of atoms; or, the functional group may be lost altogether. In the COF particle, atoms previously associated with functional groups become associated with linker groups, which are the chemical moieties that join together segments. Functional groups have characteristic chemistries and those of ordinary skill in the art can generally recognize in the present molecular building blocks the atom(s) that constitute functional group(s). It should be noted that an atom or grouping of atoms that are identified as part of the molecular building block functional group may be preserved in the linker group of the COF particle. Linker groups are described later in the embodiments.

Segment

A segment is the portion of the molecular building block which supports functional groups and comprises all atoms which are not associated with functional groups. Further, the composition of a molecular building block segment remains unchanged after COF particle formation. A segment is also the portion of the molecular building block that can provide an inclined property. Inclined properties are described later in the embodiments.

Illustrated below are non-limiting examples of molecular building blocks. In the molecular building blocks, the segment is indicated by the square and the functional groups are indicated by circles.

Molecular Building Block with One Type of Functional Group:

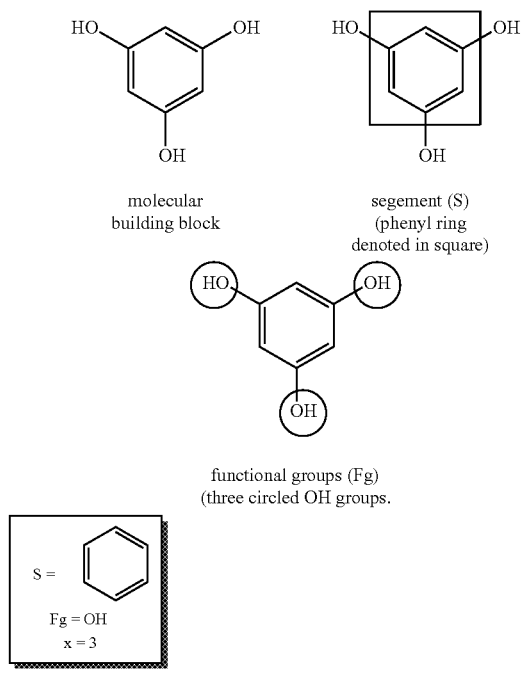

Molecular Building Block with Two Types of Functional Group:

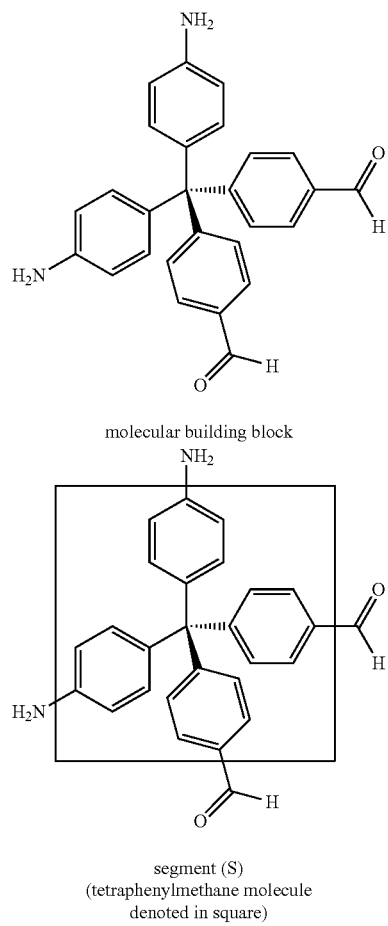

Molecular Building Block with Two Types of Functional Group:

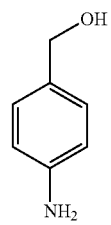
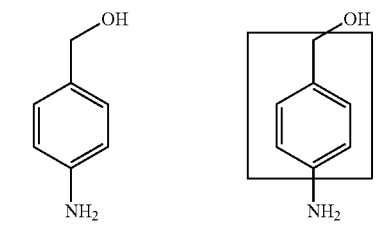

molecular building block     segment (S) (tolyl group outlined by solid box)

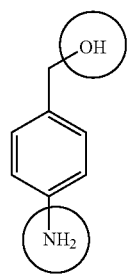

functional groups (Fg) (circled amino and circled hydroxyl groups)

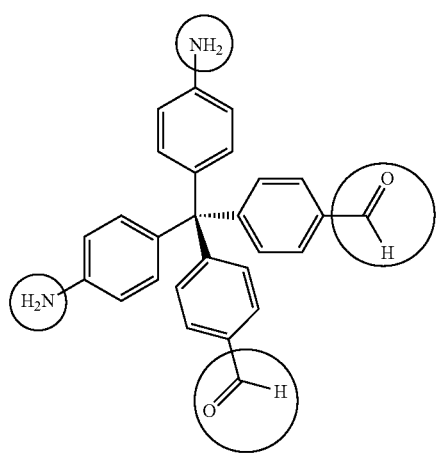

functional groups (Fg) (two circled $NH_2$ groups, and two circled CHO groups)

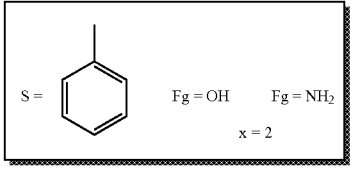

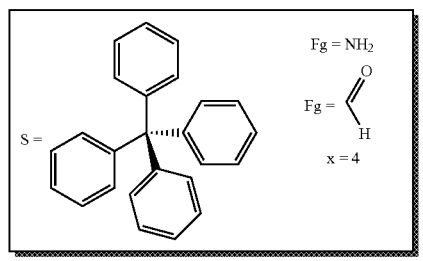

Linker in COF Particle

A linker is a chemical moiety that emerges in a COF particle upon chemical reaction between functional groups present on the molecular building blocks (illustrated below). S is the segment or portion of the molecular building block conserved in the COF, Fg is the functional group or the reactive portion of the molecular building block, and L is the linker or what connects the segment moieties in the COF.

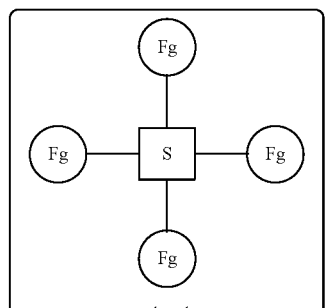

molecular building block

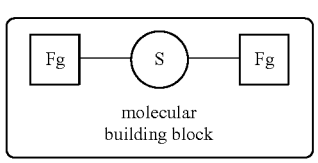

molecular building block reactive coating process

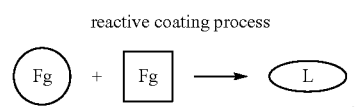

S = segment (portion of the molecular building block conserved in COF)
Fg = functional group (reactive portion of the molecular building block)
L = linker (connects segments moieties in COF)

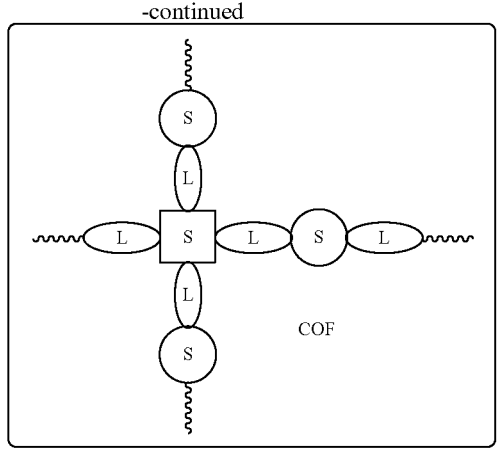

A linker may comprise a covalent bond, a single atom, or a group of covalently bonded atoms. The former is defined as a covalent bond linker and can be for instance a single covalent bond or a double covalent bond and emerges when functional groups on all partnered building blocks are lost entirely. The latter linker type is defined as a chemical moiety linker and can comprise one or more atoms bonded together by single covalent bonds, double covalent bonds, or combinations of the two. Atoms contained in linking groups originate from atoms present in functional groups on molecular building blocks prior to the COF particle forming process. Chemical moiety linkers can be, or derived from, well-known chemical groups such as, but not limited to, esters, ketones, amides, imines, ethers, urethanes, carbonates, and the like.

For example, when two hydroxyl (—OH) functional groups are used to connect segments in a COF particle via an oxygen atom, the linker would be the oxygen atom, which could be described as an ether linker. Herein the linkers are of only one type. However, in embodiments, the particle may comprise linkers which are of two or more types.

Molecular Building Blocks Symmetry

Molecular building block symmetry relates to the positioning of functional groups (Fgs) around the periphery of the molecular building block segments. Without being bound by chemical or mathematical theory, a symmetric molecular building block is one where positioning of Fgs can be associated with the ends of a rod, vertexes of a regular geometric shape, or the vertexes of a distorted rod or distorted geometric shape. For example, the most symmetric option for molecular building blocks containing four Fgs are those whose Fgs overlay with the corners of a square or the apexes of a tetrahedron.

Use of symmetrical building blocks is commonly practiced by embodiments disclosed herein for two reasons: (1) the patterning of molecular building blocks can be better anticipated because the linking of regular shapes is a better understood process in reticular chemistry, and (2) the complete reaction between molecular building blocks is facilitated because for less symmetric building blocks errant conformations/orientations can be adopted which can possibly initiate numerous linking defects within COF particles.

Drawn below are building blocks whose symmetrical elements are outlined. Such symmetrical elements (e.g., ideal and distorted rod building blocks, ideal and distorted triangular building blocks, ideal and distorted tetrahedral building blocks, and ideal and distorted square building blocks) are commonly found in building blocks used in the practice of the present embodiments.

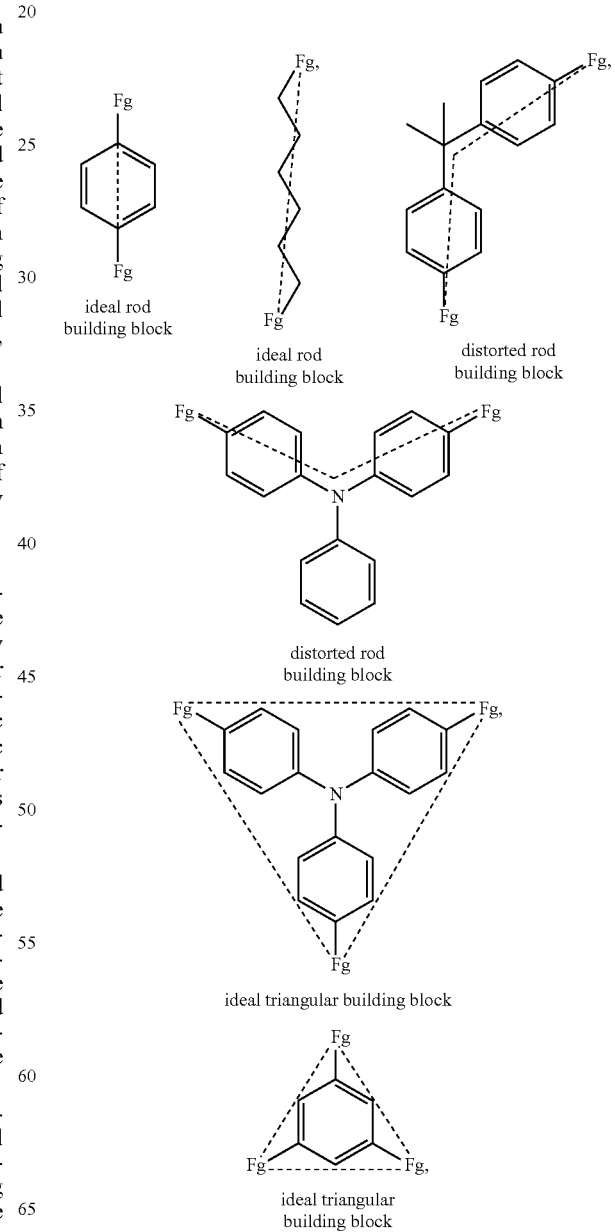

-continued

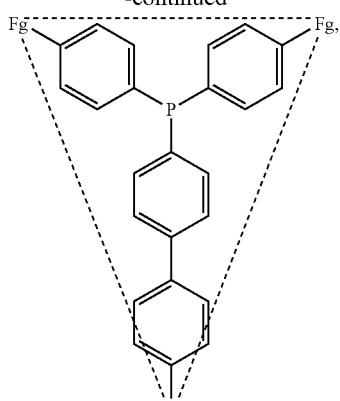
distorted triangular building block

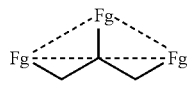
distorted triangular building block

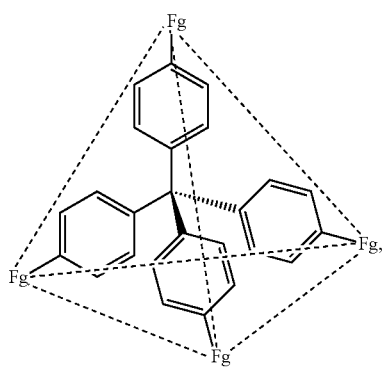
ideal tetrahedral building block

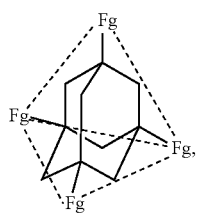
ideal tetrahedral building block

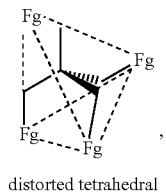
distorted tetrahedral building block

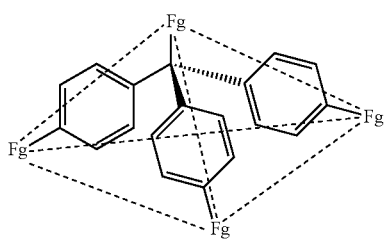
distorted tetrahedral building block

-continued

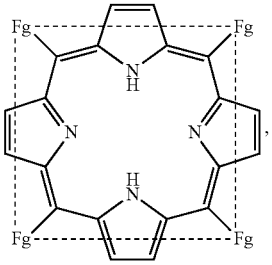
ideal square building block

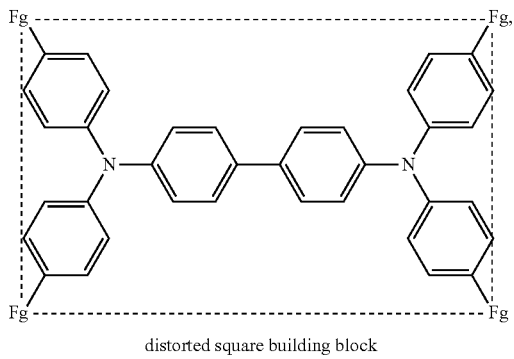
distorted square building block

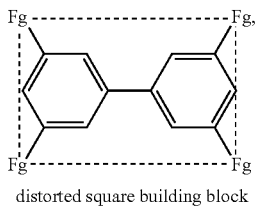
distorted square building block

Molecular Building Block Enumeration

Enumerated below are non-limiting classes of molecular entities that can serve as molecular building blocks for COF particles.

Building blocks containing a carbon or silicon atomic core may be selected from the following:

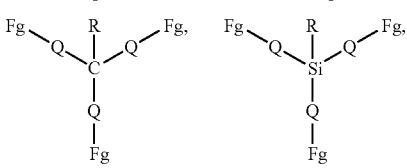

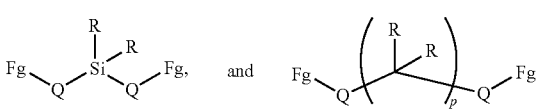

A building block containing alkoxy core is represented below:

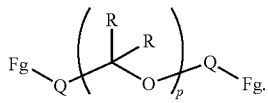

Building blocks containing a nitrogen or phosphorous atomic cores may be selected from the following:

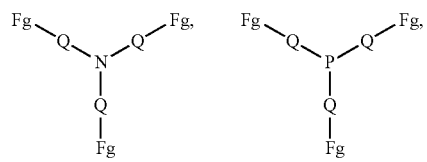

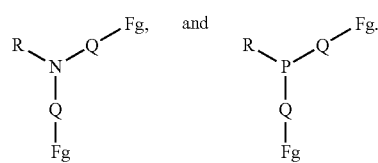

Building blocks containing aryl cores may be selected from the following:

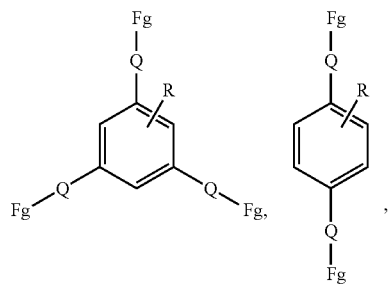

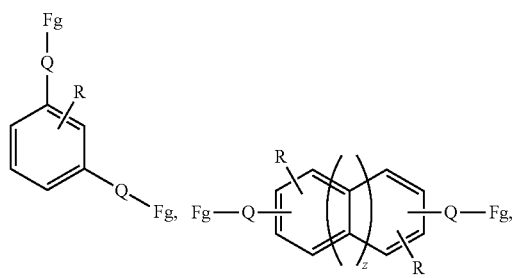

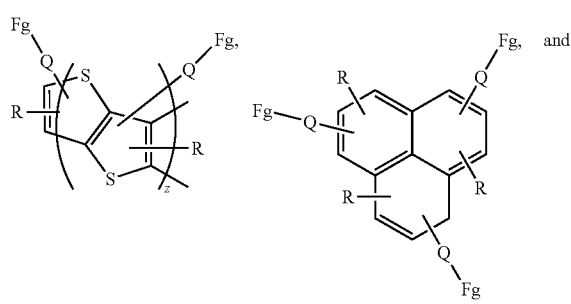

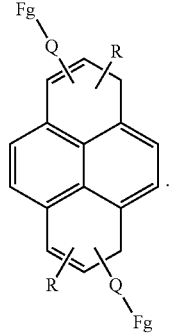

A building block containing carbonate cores is represented below:

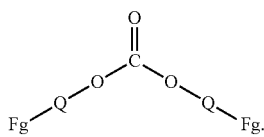

Building blocks containing carbocyclic-, carbobicyclic-, or carbotricyclic core may be selected from the following:

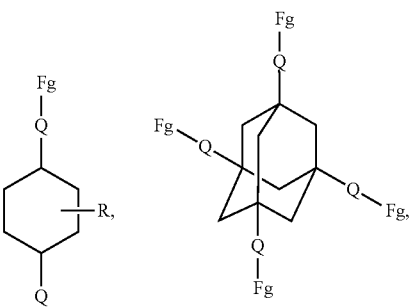

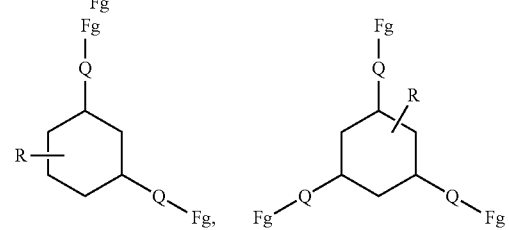

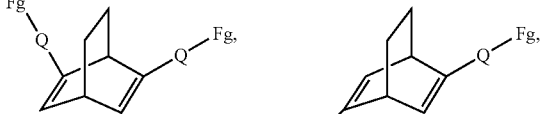

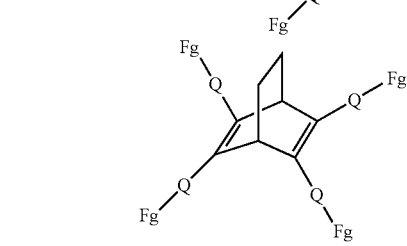

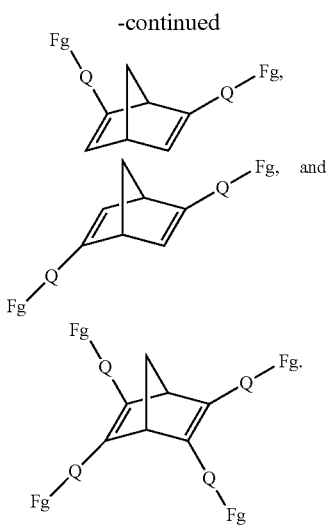

A building block containing an oligothiophene core is represented below:

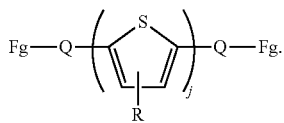

In regards to each of the above building blocks, Q is independently selected from: aryl, biaryl, triaryl, and naphthyl, optionally substituted with C1-C8 branched and unbranched alkyl, branched and unbranched C1-C8 perfluroalkyl, C1-C6 carbocylic, amino, hydroxyl, halogen, cyano, nitro, ketone, carboxylic acid, carboxylic ester, mercaptyl, thioether; aryl, biaryl, triaryl, naphthyl, containing 1-3 heteratoms per ring, optionally substituted with C1-C8 branched and unbranched alkyl, branched and unbranched C1-C8 perfluroalkyl, C1-C6 carbocylic, amino, hydroxyl, halogen, cyano, nitro, carboxylic acid, carboxylic ester, mercaptyl, thioether; branched and unbranched C1-C8 perfluroalkyl, C1-C6 carbocylic, amino, hydroxyl, halogen, cyano, nitro, carboxylic acid, ketone, carboxylic ester, mercaptyl, thioether, alkyl ether, aryl ether; C1-C12 branched and unbranched alkyl; and C1-C12 branched an unbranched perfluroalkyl; oligoether containing as many as 12 C—O units, with p ranging from about 1 to about 24, p ranging from about 1 to about 12, z ranging from about 1 to about 4, and j ranging from about 1 to about 12.

Fg is a functional group, as defined earlier in the embodiments, and can be independently selected from: alcohol, alkyl or aryl ether, cyano, amino, halogen, ketone, carboxylic acid, carboxylic acid ester, carboxylic acid chloride, aryl or alkly sulfonyl, formyl, hydrogen, isocyanate, wherein R is independently selected from: aryl, biaryl, triaryl, and naphthyl, optionally substituted with C1-C8 branched and unbranched alkyl, branched and unbranched C1-C8 perfluroalkyl, C1-C6 carbocylic, amino, hydroxyl, halogen, cyano, nitro, ketone, carboxylic acid, carboxylic ester, mercaptyl, thioether; aryl, biaryl, triaryl, naphthyl, containing 1-3 heteratoms per ring optionally substituted with C1-C8 branched and unbranched alkyl, branched and unbranched C1-C8 perfluroalkyl, C1-C6 carbocylic, amino, hydroxyl, halogen, cyano, nitro, ketone, carboxylic acid, carboxylic ester, mercaptyl, thioether; branched and unbranched C1-C8 perfluroalkyl, C1-C6 carbocylic, amino, hydroxyl, halogen, cyano, nitro, ketone, carboxylic acid, carboxylic ester, mercaptyl, thioether, alkyl ether, aryl ether; C1-C12 branched and unbranched alkyl; C1-C12 branched an unbranched perfluroalkyl; oligoether containing as many as 12 C—O units;

alcohol, alkyl or aryl ether, cyano, amino, halogen, carboxylic acid, carboxylic acid ester, ketone, carboxylic acid chloride, aryl or alkly sulfonyl, formyl, hydrogen, isocyanate and the like.

Practice of Linking Chemistry

In embodiments linking chemistry may occur wherein the reaction between functional groups produces a volatile byproduct which can be largely evaporated or expunged from the COF during or after the particle forming process or wherein no byproduct is formed. Linking chemistry may be selected to achieve a COF for applications where the presence of linking chemistry byproducts is not desired. Linking chemistry reactions may include, for example, condensation, addition/elimination, and addition reactions, such as, but not limited to, those that produce esters, imines, ethers, carbonates, urethanes, amides, acetals, and silyl ethers.

In embodiments the linking chemistry via a reaction between function groups producing a non-volatile byproduct that largely remains incorporated within the COF after the particle forming process. Linking chemistry in embodiments may be selected to achieve a COF for applications where the presence of linking chemistry byproducts does not impact the properties or for applications where the presence of linking chemistry byproducts may alter the properties of a COF (such as, for example, the electroactive nature of the COF). Linking chemistry reactions may include, for example, substitution, metathesis, and metal catalyzed coupling reactions, such as those that produce carbon-carbon bonds.

For all linking chemistry the ability to control the rate and extent of reaction between building blocks via the chemistry between building block functional groups is an embodiment of the present disclosure. A non-limiting reason for controlling the rate and extent of reaction may be for tuning the microscopic arrangement of building blocks to achieve a periodic COF particle, as defined earlier in the embodiments.

Innate Properties of COFs

COFs have innate properties such as high thermal stability (typically higher than 400° C. under atmospheric conditions); poor solubility in organic solvents (chemical stability), and porosity (capable of reversible guest uptake). In the embodiments, COF particles share these innate properties.

Added Functionality of COF Particles

Added functionality denotes a property that is not inherent to conventional COFs and may occur by the selection of molecular building blocks wherein the molecular compositions provide the added functionality in the resultant COF. Added functionality may arise upon assembly of molecular building blocks having an "inclined property" for that added functionality. Added functionality may also arise upon assembly of molecular building blocks having no "inclined property" for that added functionality but the resulting COF has the added functionality as a consequence of linking segments (S) and linkers into a COF. Furthermore, emergence of added functionality may arise from the combined effect of using molecular building blocks bearing an "inclined property" for that added functionality whose inclined property is modified or enhanced upon linking together the segments and linkers into a COF particle.

Inclined Property for Molecular Building Blocks

Added functionality denotes a property that is not inherent to conventional COFs and may occur by the selection of molecular building blocks wherein the molecular compositions provide the added functionality in the resultant COF. Added functionality may arise upon assembly of molecular building blocks having an "inclined property" for that added functionality. Added functionality may also arise upon assembly of molecular building blocks having no "inclined property" for that added functionality but the resulting COF has the added functionality as a consequence of linking segments (S) and linkers into a COF. Furthermore, emergence of added functionality may arise from the combined effect of using molecular building blocks bearing an "inclined property" for that added functionality whose inclined property is modified or enhanced upon linking together the segments and linkers into a COF.

An Inclined Property of a Molecular Building Block

The term "inclined property" of a molecular building block refers, for example, to a property known to exist for certain molecular compositions or a property that is reasonably identifiable by a person skilled in art upon inspection of the molecular composition of a segment. As used herein, the terms "inclined property" and "added functionality" refer to the same general property (e.g., hydrophobic, electroactive, etc.) but "inclined property" is used in the context of the molecular building block and "added functionality" is used in the context of the COF.

The term electroactive refers, for example, to the property to transport electrical charge (electrons and/or holes). Electroactive materials include conductors, semiconductors, and charge transport materials. Conductors are defined as materials that readily transport electrical charge in the presence of a potential difference. Semiconductors are defined as materials do not inherently conduct charge but can become conductive in the presence of a potential difference and an applied stimuli, such as, for example, an electric field, electromagnetic radiation, heat, and the like. Charge transport materials are defined as materials that can transport charge when charge is injected from another material such as, for example, a dye, pigment, or metal in the presence of a potential difference.

Conductors can be further defined as materials that give a signal using a potentiometer from about 0.1 to about $10^7$ S/cm.

Semiconductors can be further defined as materials that give a signal using a potentiometer from about $10^{-6}$ to about $10^4$ S/cm in the presence of applied stimuli such as, for example an electric field, electromagnetic radiation, heat, and the like. Alternatively, semiconductors can be defined as materials having electron and/or hole mobility measured using time-of-flight techniques in the range of $10^{-10}$ to about $10^6$ $cm^2V^{-1}s^{-1}$ when exposed to applied stimuli such as, for example an electric field, electromagnetic radiation, heat, and the like.

Charge transport materials can be further defined as materials that have electron and/or hole mobility measured using time-of-flight techniques in the range of $10^{-10}$ to about $10^6$ $cm^2V^{-1}s^{-1}$. It should be noted that under some circumstances charge transport materials may be also classified as semiconductors.

COFs with electroactive added functionality may be prepared by using molecular building blocks with inclined electroactive properties and/or be electroactive resulting from the assembly of conjugated segments and linkers. The following sections describe molecular building blocks with inclined hole transport properties, inclined electron transport properties, and inclined semiconductor properties.

COFs with hole transport added functionality may be obtained by selecting segment cores such as, for example, triarylamines, hydrazones (U.S. Pat. No. 7,202,002 B2 to Tokarski et al.), and enamines (U.S. Pat. No. 7,416,824 B2 to Kondoh et al.) with the following general structures:

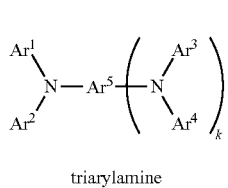

triarylamine

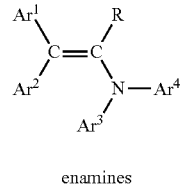

enamines

-continued

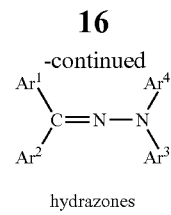

hydrazones

The segment core comprising a triarylamine being represented by the following general formula:

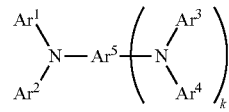

wherein $Ar^1$, $Ar^2$, $Ar^3$, $Ar^4$ and $Ar^5$ each independently represents a substituted or unsubstituted aryl group, or $Ar^5$ independently represents a substituted or unsubstituted arylene group, and k represents 0 or 1, wherein at least two of $Ar^1$, $Ar^2$, $Ar^3$, $Ar^4$ and $Ar^5$ comprises a Fg (previously defined). $Ar^5$ can be further defined as, but not limited to, a substituted phenyl ring or substituted/unsubstituted phenylene.

Examples of segment cores comprising arylamines with hole transport added functionality include, but not limited to, aryl amines such as triphenylamine, N,N,N',N'-tetraphenyl-(1,1'-biphenyl)-4,4'-diamine, N,N'-diphenyl-N,N'-bis(3-methylphenyl)-(1,1'-biphenyl)-4,4'-diamine, N,N'-bis(4-butylphenyl)-N,N'-diphenyl-[p-terphenyl]-4,4"-diamine; hydrazones such as N-phenyl-N-methyl-3-(9-ethyl)carbazyl hydrazone and 4-diethyl amino benzaldehyde-1,2-diphenyl hydrazone; and oxadiazoles such as 2,5-bis(4-N,N'-diethylaminophenyl)-1,2,4-oxadiazole, stilbenes, and the like.

Examples of molecular building blocks comprising triarylamine core segments with inclined hole transport properties can be derived from the list of chemical structures including, but limited to, those listed below:

triarylamine cores

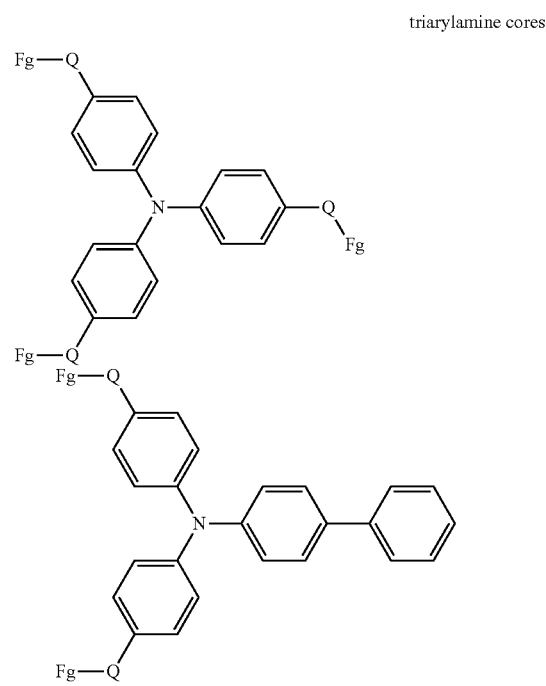

-continued
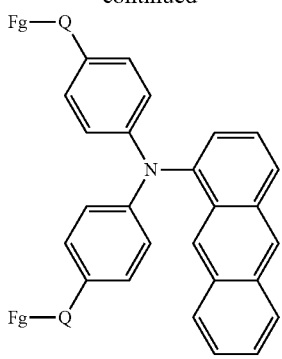
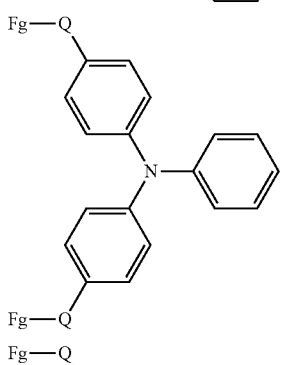
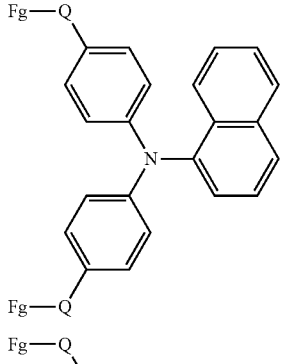
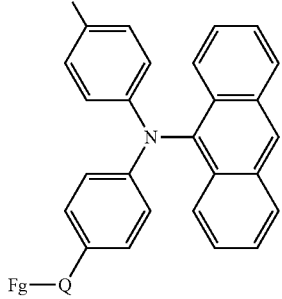
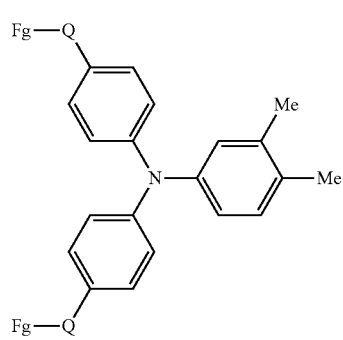
-continued
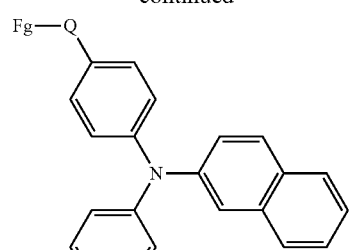
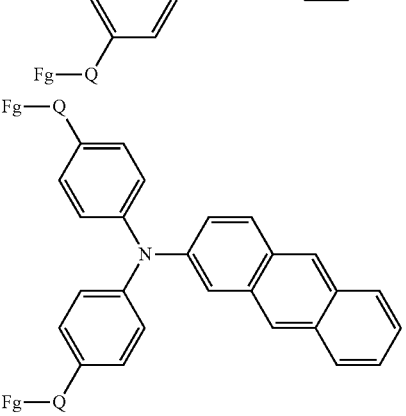
tetraarylbiphenylenediamine (TBD) cores
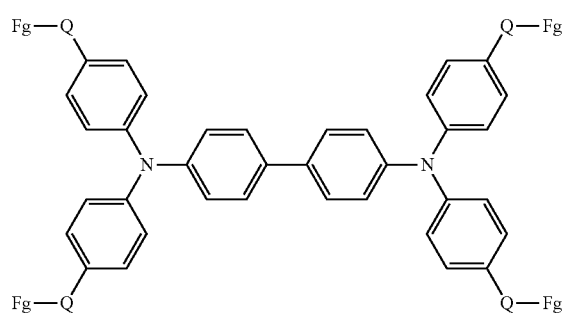
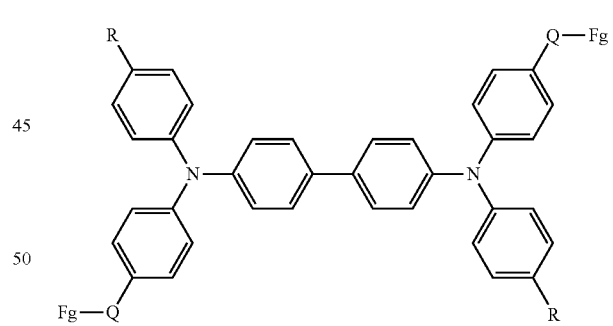
tetraarylterphenylenediamine (TER) cores
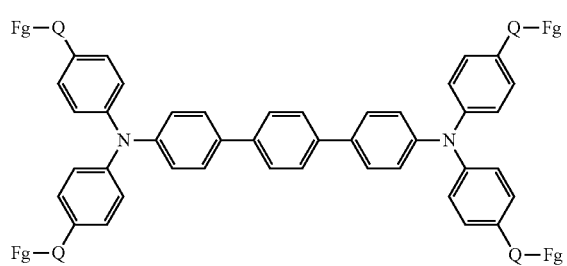

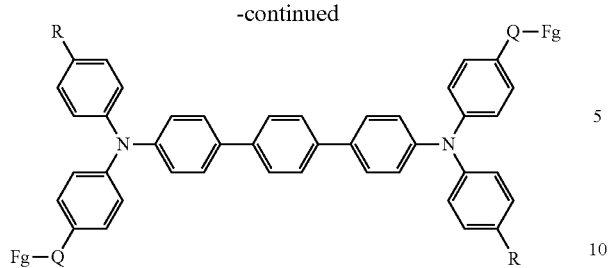

The segment core comprising a hydrazone being represented by the following general formula:

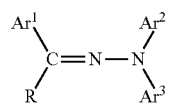

wherein $Ar^1$, $Ar^2$, and $Ar^3$ each independently represents an aryl group optionally containing one or more substituents, and R represents a hydrogen atom, an aryl group, or an alkyl group optionally containing a substituent; wherein at least two of $Ar^1$, $Ar^2$, and $Ar^3$ comprises a Fg (previously defined); and a related oxadiazole being represented by the following general formula:

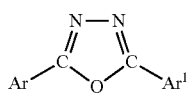

wherein Ar and $Ar^1$ each independently represent an aryl group that comprises a Fg (previously defined).

Examples of molecular building blocks comprising hydrazone and oxadiazole core segments with inclined hole transport properties can be derived from the list of chemical structures including, but limited to, those listed below:

hydrazone cores

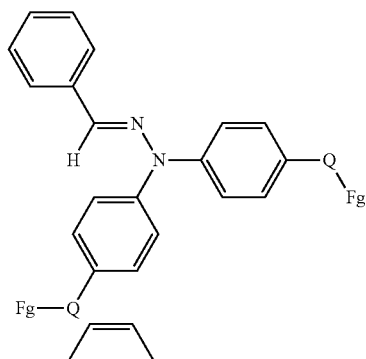

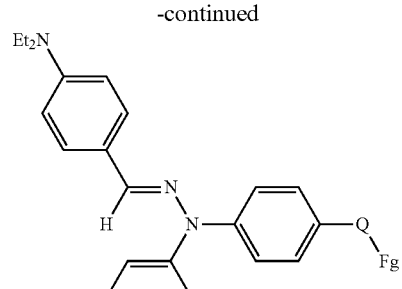

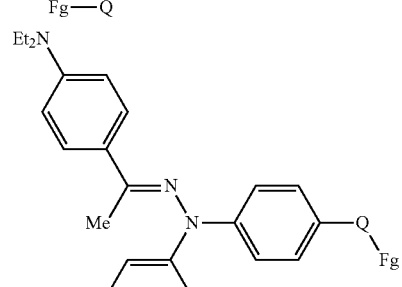

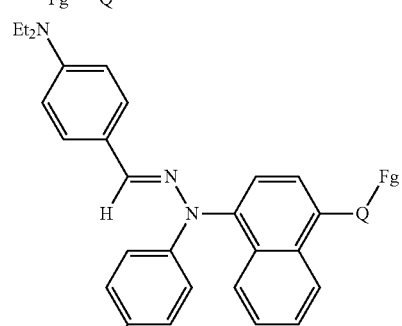

oxadiazole cores

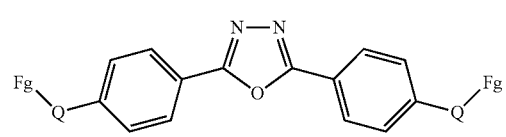

The segment core comprising an enamine being represented by the following general formula:

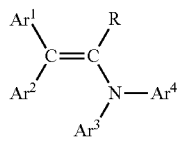

wherein $Ar^1$, $Ar^2$, $Ar^3$, and $Ar^4$ each independently represents an aryl group that optionally contains one or more substituents or a hetercycle group that optionally contains one or more substituents, and R represents a hydrogen atom, an aryl group, or an alkyl group optionally containing a substituent; wherein at least two of $Ar^1$, $Ar^2$, $Ar^3$, and $Ar^4$ comprises a Fg (previously defined).

Examples of molecular building blocks comprising enamine core segments with inclined hole transport properties can be derived from the list of chemical structures including, but limited to, those listed below:

enamine cores

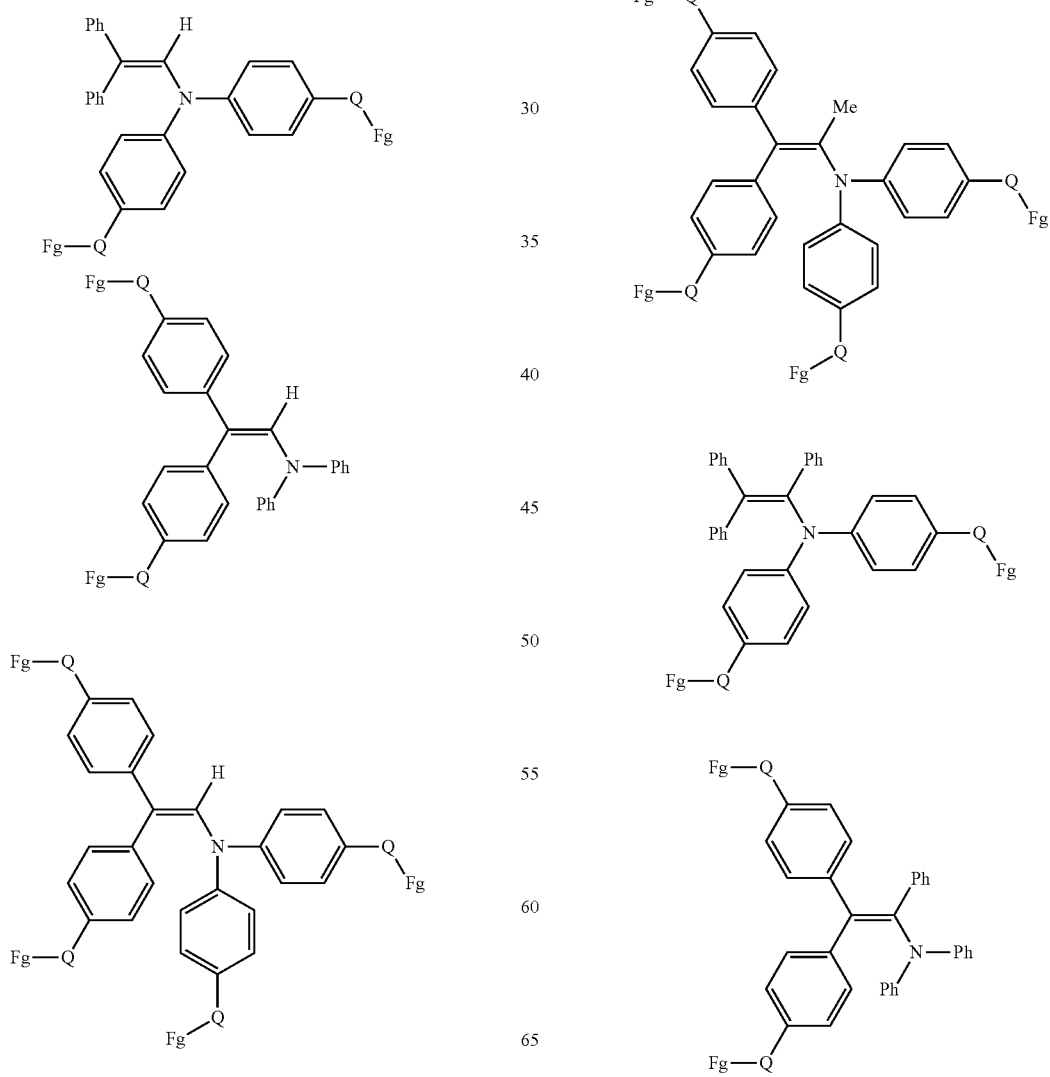

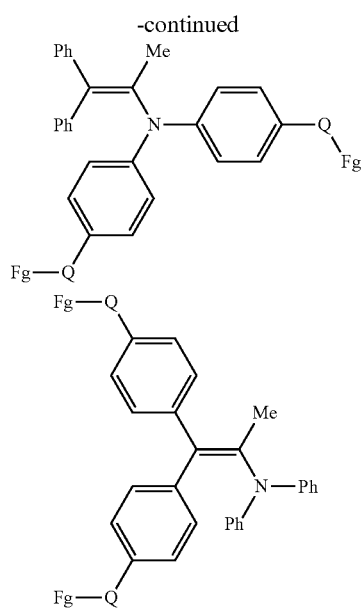

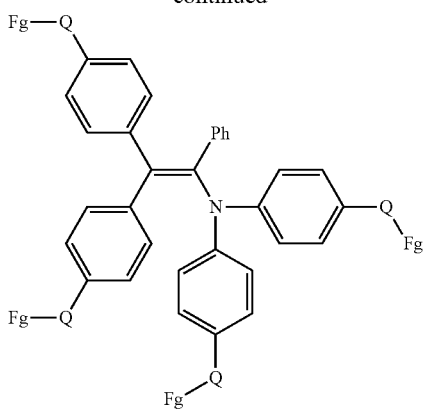

COF particles with electron transport added functionality can be obtained by selecting segment cores comprising, but not limited to, nitrofluorenones, 9-fluorenylidene malonitriles, diphenoquinones, and naphthalenetetracarboxylic diimides with the following general structures:

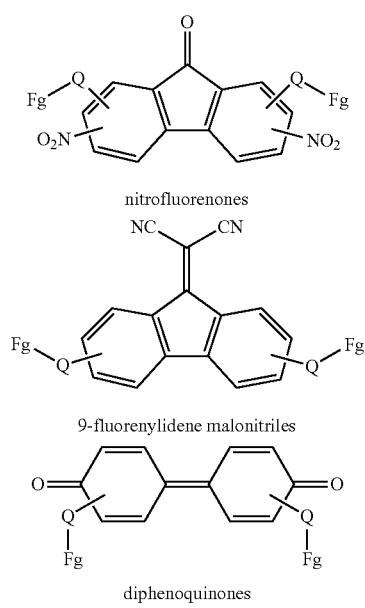

nitrofluorenones 9-fluorenylidene malonitriles diphenoquinones

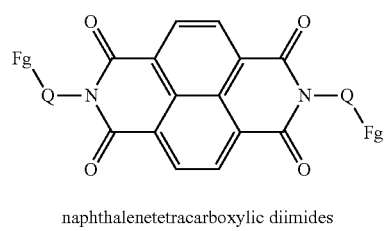

naphthalenetetracarboxylic diimides

It should be noted that the carbonyl groups of diphenylquinones could also act as Fgs in the COF particle forming process.

COF particles with semiconductor added functionality can be obtained by selecting segment cores such as, but not limited to, acenes, thiophenes/oligothiophenes/fused thiophenes, perylene bisimides, or tetrathiofulvalenes, and derivatives thereof with the following general structures:

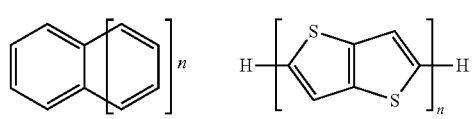

acenes

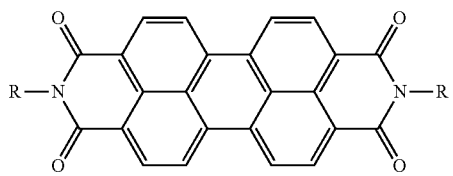

perylene bisimides

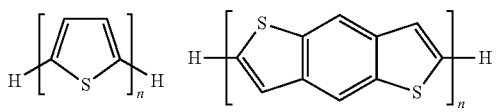

oligothiophenes

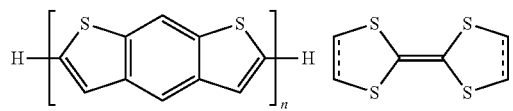

fused thiophenes    tetrathiofulvalenes

The COF particle may be a p-type semiconductor, n-type semiconductor or ambipolar semiconductor. The COF particle semiconductor type depends on the nature of the molecular building blocks. Molecular building blocks which possess an electron donating property such as alkyl, alkoxy, aryl, and amino groups, when present in the COF particle, may render the COF particle a p-type semiconductor. On the other hand, molecular building blocks which are electron withdrawing such as cyano, nitro, fluoro, fluorinated alkyl, and fluorinated aryl groups may render the COF particle into the n-type semiconductor.

Examples of molecular building blocks comprising acene core segments with inclined semiconductor properties can be derived from the list of chemical structures including, but limited to, those listed below:

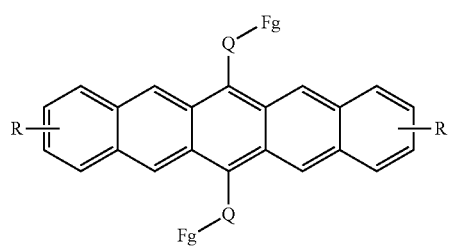

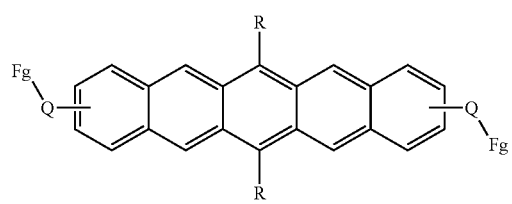

-continued

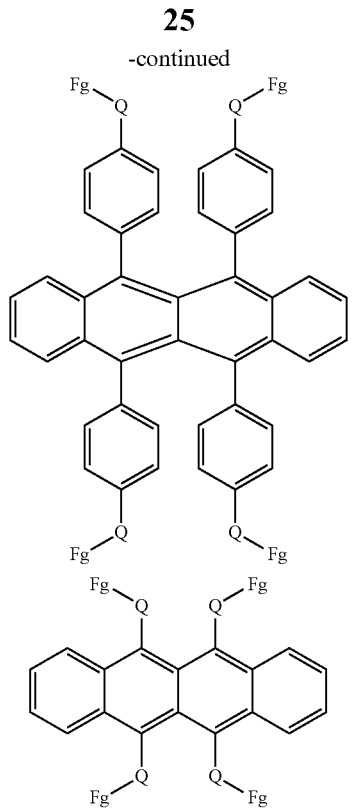

Examples of molecular building blocks comprising thiophene/oligothiophene/fused thiophene core segments with inclined semiconductor properties can be derived from the list of chemical structures including, but limited to, those listed below:

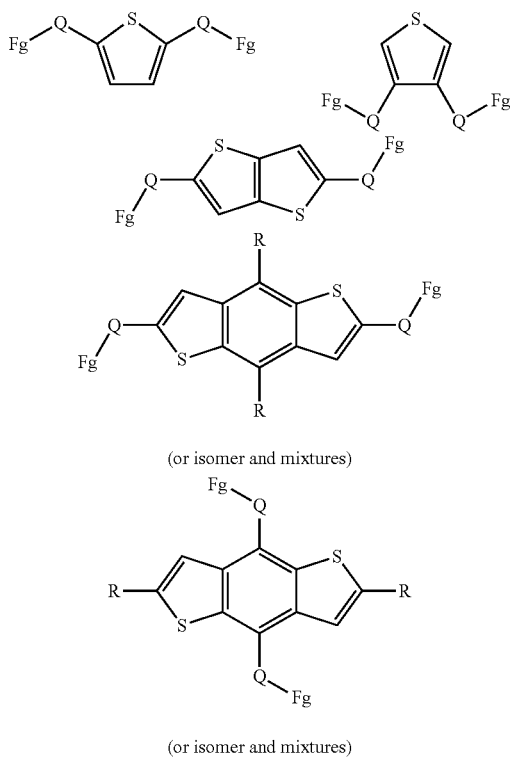

(or isomer and mixtures)

-continued

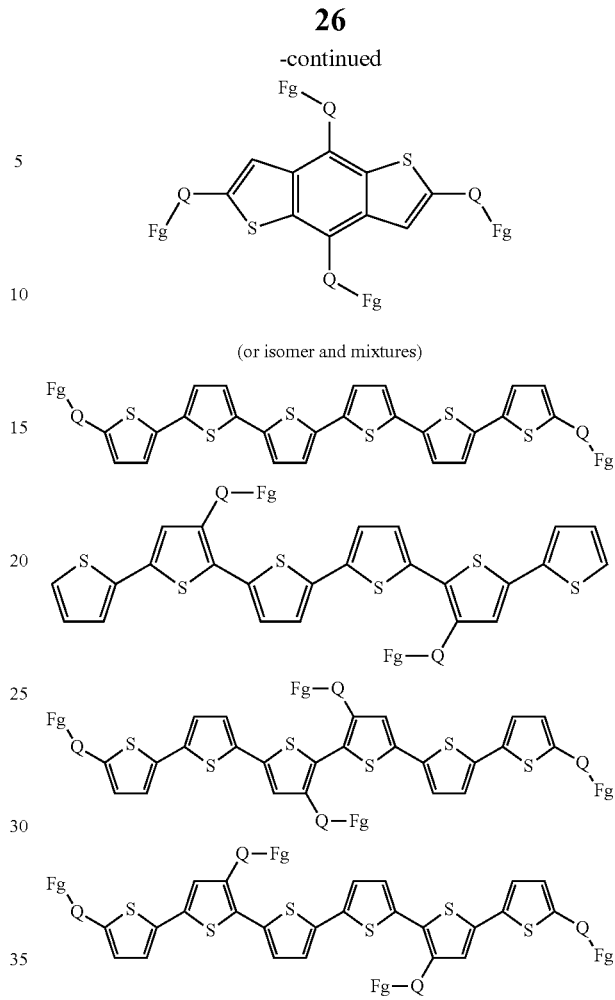

Examples of molecular building blocks comprising perylene bisimide core segments with inclined semiconductor properties can be derived from the chemical structure below:

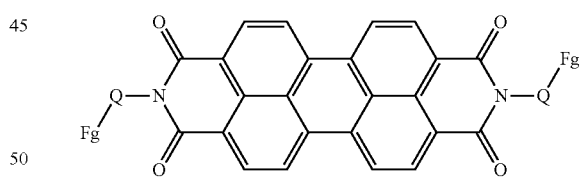

Examples of molecular building blocks comprising tetrathiofulvalene core segments with inclined semiconductor properties can be derived from the list of chemical structures including, but limited to, those listed below:

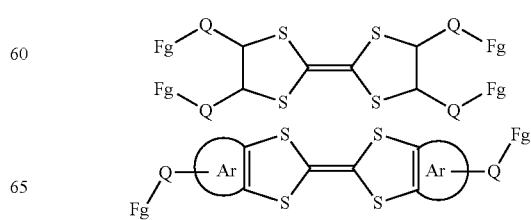

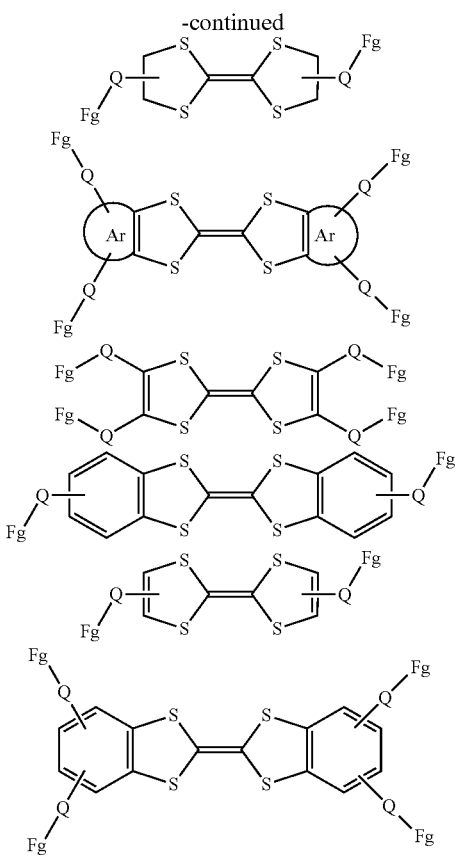

wherein Ar each independently represents an aryl group that optionally contains one or more substituents or a hetercycle group that optionally contains one or more substituents.

Similarly, the electroactivity of COF particles prepared by these molecular building blocks will depend on the nature of the segments, nature of the linkers, and how the segments are orientated within the COF particle. Linkers that favor preferred orientations of the segment moieties in the COF particle are expected to lead to higher electroactivity.

Preparation of Charge Transport Particles

The process for making charge transport particles typically comprises a number of activities or steps (set forth below) that may be performed in any suitable sequence or where two or more activities are performed simultaneously or in close proximity in time:

A process for preparing a charge transport particle comprising:
(a) preparing a liquid-containing reaction mixture comprising a plurality of molecular building blocks each comprising a segment and a number of functional groups;
(b) optionally purging the liquid-containing reaction mixture with an inert gas;
(c) sealing the reaction vessel such that the liquid from the reaction mixture does not escape;
(d) promoting a change of the liquid-containing reaction mixture including the molecular building blocks to a heterogeneous mixture comprising the charge transport particle comprising a plurality of the segments and a plurality of linkers arranged as a covalent organic framework.
(e) isolating the charge transport particle by filtration, decanting the resulting liquid from the vessel, or another method known by someone skilled in the art.
(f) optionally grinding, milling, or crushing the resulting transport particle to an average size.

The above activities or steps may be conducted at atmospheric, super atmospheric, or subatmopheric pressure. The term "atmospheric pressure" as used herein refers to a pressure of about 760 torr. The term "super atmospheric" refers to pressures greater than atmospheric pressure, but less than 20 atm. The term "subatmospheric pressure" refers to pressures less than atmospheric pressure. In an embodiment, the activities or steps may be conducted at or near atmospheric pressure. Generally, pressures of from about 0.1 atm to about 2 atm, such as from about 0.5 atm to about 1.5 atm, or 0.8 atm to about 1.2 atm may be conveniently employed.

The reaction mixture comprises a plurality of molecular building blocks that are dissolved, suspended, or mixed in a liquid. The plurality of molecular building blocks may be of one type or two or more types. When one or more of the molecular building blocks is a liquid, the use of an additional liquid is optional. Catalysts may optionally be added to the reaction mixture to enable charge transport particle formation or modify the kinetics of particle formation during Action C described above.

The reaction mixture components (molecular building blocks, optionally a liquid, and optionally catalysts) are combined in a vessel. The order of addition of the reaction mixture components may vary; however, typically the catalyst is added last. In particular embodiments, the molecular building blocks are heated in the liquid in the absence of the catalyst to aid the dissolution of the molecular building blocks. The reaction mixture may also be mixed, stirred, milled, or the like, to ensure even distribution of the formulation components prior to optionally purging the reaction mixture with inert gas, and sealing the reaction vessel.

In embodiments, the reaction mixture may be heated prior to optionally purging the reaction mixture with inert gas, and sealing the reaction vessel. This may aid the dissolution of one or more of the molecular building blocks and/or increase the viscosity of the reaction mixture by the partial reaction of the reaction mixture prior to optionally purging the reaction mixture with inert gas, and sealing the reaction vessel. This approach may be used to increase the loading of the molecular building blocks in the reaction mixture.

The molecular building block loading or "loading" in the reaction mixture is defined as the total weight of the molecular building blocks and optionally the catalysts divided by the total weight of the reaction mixture. Building block loadings may range from about 3 to 100%, such as from about 5 to about 50%, or from about 15 to about 40%. In the case where a liquid molecular building block is used as the only liquid component of the reaction mixture (i.e. no additional liquid is used), the building block loading would be about 100%.

Liquids used in the reaction mixture may be pure liquids, such as solvents, and/or solvent mixtures. Liquids are used to dissolve or suspend the molecular building blocks and catalyst/modifiers in the reaction mixture. Liquid selection is generally based on balancing the solubility/dispersion of the molecular building blocks and a particular building block loading, the viscosity of the reaction mixture, and the boiling point of the liquid, which impacts the formation of the charge transport particle. Suitable liquids may have boiling points from about 30 to about 300° C., such as from about 65° C. to about 250° C., or from about 100° C. to about 180° C.

Liquids can include molecule classes such as alkanes (hexane, heptane, octane, nonane, decane, cyclohexane, cycloheptane, cyclooctane, decalin); mixed alkanes (hexanes, heptanes); branched alkanes (isooctane); aromatic compounds (toluene, o-, m-, p-xylene, mesitylene, nitrobenzene, benzonitrile, butylbenzene, aniline); ethers (benzyl ethyl ether, butyl ether, isoamyl ether, propyl ether); cyclic ethers (tetrahydrofuran, dioxane), esters (ethyl acetate, butyl acetate, butyl butyrate, ethoxyethyl acetate, ethyl propionate, phenyl acetate, methyl benzoate); ketones (acetone, methyl ethyl ketone, methyl isobutylketone, diethyl ketone, chloroacetone, 2-heptanone), cyclic ketones (cyclopentanone, cyclohexanone), amines (1°, 2°, or 3° amines such as butylamine, diisopropylamine, triethylamine, diisoproylethylamine; pyridine); amides (dimethylformamide, N-methylpyrolidinone, N,N-dimethylformamide); alcohols (methanol, ethanol, n-, i-propanol, n-, i-, t-butanol, 1-methoxy-2-propanol, hexanol, cyclohexanol, 3-pentanol, benzyl alcohol); nitriles (acetonitrile, benzonitrile, butyronitrile), halogenated aromatics (chlorobenzene, dichlorobenzene, hexafluorobenzene), halogenated alkanes (dichloromethane, chloroform, dichloroethylene, tetrachloroethane); and water.

Mixed liquids comprising a first solvent, second solvent, third solvent, and so forth may also be used in the reaction mixture. Two or more liquids may be used to aid the dissolution/dispersion of the molecular building blocks; and/or increase the molecular building block loading; and/or modulate the promotion of the reaction mixture to the charge transport particle heterogeneous mixture. In embodiments, the second solvent is a solvent whose boiling point or vapor-pressure curve or affinity for the molecular building blocks differs from that of the first solvent. In embodiments, a first solvent has a boiling point higher than that of the second solvent. In embodiments, the second solvent has a boiling point equal to or less than about 100° C., such as in the range of from about 30° C. to about 100° C., or in the range of from about 40° C. to about 90° C., or about 50° C. to about 80° C.

In embodiments, the first solvent, or higher boiling point solvent, has a boiling point equal to or greater than about 65° C., such as in the range of from about 80° C. to about 300° C., or in the range of from about 100° C. to about 250° C., or about 100° C. to about 180° C. The higher boiling point solvent may include, for example, the following (the value in parentheses is the boiling point of the compound): hydrocarbon solvents such as amylbenzene (202° C.), isopropylbenzene (152° C.), 1,2-diethylbenzene (183° C.), 1,3-diethylbenzene (181° C.), 1,4-diethylbenzene (184° C.), cyclohexylbenzene (239° C.), dipentene (177° C.), 2,6-dimethylnaphthalene (262° C.), p-cymene (177° C.), camphor oil (160-185° C.), solvent naphtha (110-200° C.), cis-decal in (196° C.), trans-decal in (187° C.), decane (174° C.), tetralin (207° C.), turpentine oil (153-175° C.), kerosene (200-245° C.), dodecane (216° C.), dodecylbenzene (branched), and so forth; ketone and aldehyde solvents such as acetophenone (201.7° C.), isophorone (215.3° C.), phorone (198-199° C.), methylcyclohexanone (169.0-170.5° C.), methyl n-heptyl ketone (195.3° C.), and so forth; ester solvents such as diethyl phthalate (296.1° C.), benzyl acetate (215.5° C.), γ-butyrolactone (204° C.), dibutyl oxalate (240° C.), 2-ethylhexyl acetate (198.6° C.), ethyl benzoate (213.2° C.), benzyl formate (203° C.), and so forth; diethyl sulfate (208° C.), sulfolane (285° C.), and halohydrocarbon solvents; etherified hydrocarbon solvents; alcohol solvents; ether/acetal solvents; polyhydric alcohol solvents; carboxylic anhydride solvents; phenolic solvents; water; and silicone solvents.

The ratio of the mixed liquids may be established by one skilled in the art. The ratio of liquids a binary mixed liquid may be from about 1:1 to about 99:1, such as from about 1:10 to about 10:1, or about 1:5 to about 5:1, by volume. When n liquids are used, with n ranging from about 3 to about 6, the amount of each liquid ranges from about 1% to about 95% such that the sum of each liquid contribution equals 100%.

Mixed liquids may be used to slow the rate of conversion of the reaction mixture to the charge transport particles in order to manipulate the characteristics of the particles. For condensation and addition/elimination linking chemistries, liquids such as water, 1°, 2°, or 3° alcohols (such as methanol, ethanol, propanol, isopropanol, butanol, 1-methoxy-2-propanol, tert-butanol) may be used.

Optionally a catalyst may be present in the reaction mixture to assist the promotion of the reaction mixture to the charge transport particle. Selection and use of the optional catalyst depends on the functional groups on the molecular building blocks. Catalysts may be homogeneous (dissolved) or heterogeneous (undissolved or partially dissolved) and include Brönsted acids (HCl (aq), acetic acid, p-toluenesulfonic acid, amine-protected p-toluenesulfonic acid such as pyrridium p-toluenesulfonate, trifluoroacetic acid); Lewis acids (boron trifluoroetherate, aluminum trichloride); Brönsted bases (metal hydroxides such as sodium hydroxide, lithium hydroxide, potassium hydroxide; 1°, 2°, or 3° amines such as butylamine, diisopropylamine, triethylamine, diisoproylethylamine); Lewis bases (N,N-dimethyl-4-aminopyridine); metals (Cu bronze); metal salts ($FeCl_3$, $AuCl_3$); and metal complexes (ligated palladium complexes, ligated ruthenium catalysts). Typical catalyst loading ranges from about 0.01% to about 25%, such as from about 0.1% to about 5% of the molecular building block loading in the reaction mixture. The catalyst may or may not be present in the final charge transport particle composition.

Applications of COF Particles

COF particles can be used in for instance electronic devices such as solar cells, radio frequency identification tags, organic light emitting devices, photoreceptors, thin film transistors and the like.

COF Particles in Photoreceptor Layers

Figure 2:
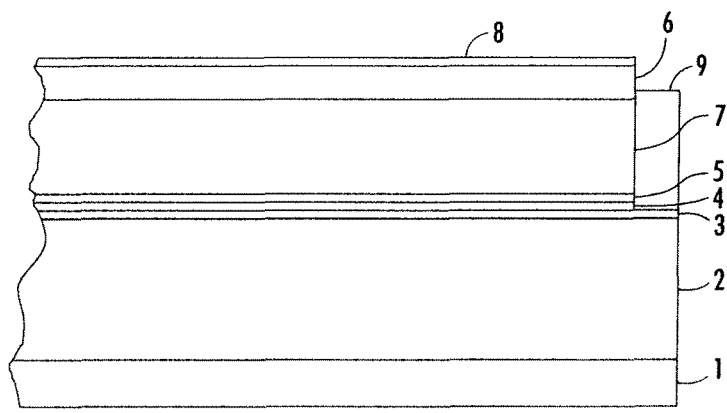
FIG. 2 represents a simplified side view of a second embodiment of the inventive photoreceptor.
Figure 3:
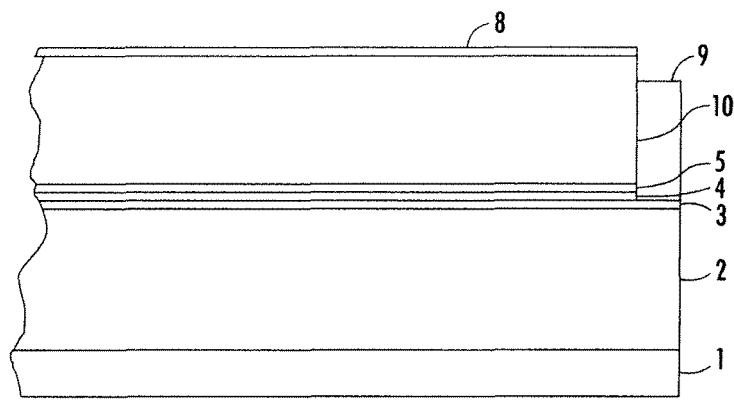
FIG. 3 represents a simplified side view of a third embodiment of the inventive photoreceptor.

Representative structures of an electrophotographic imaging member (e.g., a photoreceptor) are shown in FIGS. 1-3. These imaging members are provided with an anti-curl layer 1, a supporting substrate 2, an electrically conductive ground plane 3, a charge blocking layer 4, an adhesive layer 5, a charge generating layer 6, a charge transport layer 7, an overcoating layer 8, and a ground strip 9. In FIG. 3, imaging layer 10 (containing both charge generating material and charge transport material) takes the place of separate charge generating layer 6 and charge transport layer 7.

As seen in the figures, in fabricating a photoreceptor, a charge generating material (CGM) and a charge transport material (CTM) may be deposited onto the substrate surface either in a laminate type configuration where the CGM and CTM are in different layers (e.g., FIGS. 1 and 2) or in a single layer configuration where the CGM and CTM are in the same layer (e.g., FIG. 3). The photoreceptors embodying the present embodiments can be prepared by applying over the electrically conductive layer the charge generation layer 6 and, optionally, a charge transport layer 7. In embodiments, the charge generation layer and, when present, the charge transport layer, may be applied in either order.

Anti Curl Layer

For some applications, an optional anti-curl layer 1 can be provided, which comprises film-forming organic or inorganic polymers that are electrically insulating or slightly semi-conductive. The anti-curl layer provides flatness and/or abrasion resistance.

Anti-curl layer 1 can be formed at the back side of the substrate 2, opposite the imaging layers. The anti-curl layer may include, in addition to the film-forming resin, an adhesion promoter polyester additive. Examples of film-forming resins useful as the anti-curl layer include, but are not limited to, polyacrylate, polystyrene, poly(4,4'-isopropylidene diphenylcarbonate), poly(4,4'-cyclohexylidene diphenylcarbonate), mixtures thereof and the like.

Additives may be present in the anti-curl layer in the range of about 0.5 to about 40 weight percent of the anti-curl layer. Additives include organic and inorganic particles which can further improve the wear resistance and/or provide charge relaxation property. Organic particles include Teflon powder, carbon black, and graphite particles. Inorganic particles include insulating and semiconducting metal oxide particles such as silica, zinc oxide, tin oxide and the like. Another semiconducting additive is the oxidized oligomer salts as described in U.S. Pat. No. 5,853,906. The oligomer salts are oxidized N, N,N',N'-tetra-p-tolyl-4,4'-biphenyldiamine salt.

Typical adhesion promoters useful as additives include, but are not limited to, duPont 49,000 (duPont), Vitel PE-100, Vitel PE-200, Vitel PE-307 (Goodyear), mixtures thereof and the like. Usually from about 1 to about 15 weight percent adhesion promoter is selected for film-forming resin addition, based on the weight of the film-forming resin.

The thickness of the anti-curl layer is typically from about 3 micrometers to about 35 micrometers and, preferably, about 14 micrometers. However, thicknesses outside these ranges can be used.

The anti-curl coating can be applied as a solution prepared by dissolving the film-forming resin and the adhesion promoter in a solvent such as methylene chloride. The solution may be applied to the rear surface of the supporting substrate (the side opposite the imaging layers) of the photoreceptor device, for example, by web coating or by other methods known in the art. Coating of the overcoat layer and the anti-curl layer can be accomplished simultaneously by web coating onto a multilayer photoreceptor comprising a charge transport layer, charge generation layer, adhesive layer, blocking layer, ground plane and substrate. The wet film coating is then dried to produce the anti-curl layer 1.

The Supporting Substrate

As indicated above, the photoreceptors are prepared by first providing a substrate 2, e.g., a support. The substrate can be opaque or substantially transparent and can comprise any of numerous suitable materials having given required mechanical properties.

The substrate can comprise a layer of electrically non-conductive material or a layer of electrically conductive material, such as an inorganic or organic composition. If a non-conductive material is employed, it is necessary to provide an electrically conductive ground plane over such non-conductive material. If a conductive material is used as the substrate, a separate ground plane layer may not be necessary.

The substrate can be flexible or rigid and can have any of a number of different configurations, such as, for example, a sheet, a scroll, an endless flexible belt, a web, a cylinder, and the like. The photoreceptor may be coated on a rigid, opaque, conducting substrate, such as an aluminum drum.

Various resins can be used as electrically non-conducting materials, including, but not limited to, polyesters, polycarbonates, polyamides, polyurethanes, and the like. Such a substrate preferably comprises a commercially available biaxially oriented polyester known as MYLAR™, available from E. I. duPont de Nemours & Co., MELINEX™, available from ICI Americas Inc., or HOSTAPHAN™, available from American Hoechst Corporation. Other materials of which the substrate may be comprised include polymeric materials, such as polyvinyl fluoride, available as TEDLAR™ from E. I. duPont de Nemours & Co., polyethylene and polypropylene, available as MARLEX™ from Phillips Petroleum Company, polyphenylene sulfide, RYTON™ available from Phillips Petroleum Company, and polyimides, available as KAPTON™ from E. I. duPont de Nemours & Co. The photoreceptor can also be coated on an insulating plastic drum, provided a conducting ground plane has previously been coated on its surface, as described above. Such substrates can either be seamed or seamless.

When a conductive substrate is employed, any suitable conductive material can be used. For example, the conductive material can include, but is not limited to, metal flakes, powders or fibers, such as aluminum, titanium, nickel, chromium, brass, gold, stainless steel, carbon black, graphite, or the like, in a binder resin including metal oxides, sulfides, silicides, quaternary ammonium salt compositions, conductive polymers such as polyacetylene or its pyrolysis and molecular doped products, charge transfer complexes, and polyphenyl silane and molecular doped products from polyphenyl silane. A conducting plastic drum can be used, as well as the conducting metal drum made from a material such as aluminum.

The thickness of the substrate depends on numerous factors, including the required mechanical performance and economic considerations. The thickness of the substrate is typically within a range of from about 65 micrometers to about 150 micrometers, and preferably is from about 75 micrometers to about 125 micrometers for optimum flexibility and minimum induced surface bending stress when cycled around small diameter rollers, e.g., 19 mm diameter rollers. The substrate for a flexible belt can be of substantial thickness, for example, over 200 micrometers, or of minimum thickness, for example, less than 50 micrometers, provided there are no adverse effects on the final photoconductive device. Where a drum is used, the thickness should be sufficient to provide the necessary rigidity. This is usually about 1-6 mm.

The surface of the substrate to which a layer is to be applied is preferably cleaned to promote greater adhesion of such a layer. Cleaning can be effected, for example, by exposing the surface of the substrate layer to plasma discharge, ion bombardment, and the like. Other methods, such as solvent cleaning, can be used.

Regardless of any technique employed to form a metal layer, a thin layer of metal oxide generally forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

The Electrically Conductive Ground Plane

As stated above, photoreceptors prepared in accordance with the present embodiments comprise a substrate that is either electrically conductive or electrically non-conductive. When a non-conductive substrate is employed, an electrically conductive ground plane 3 must be employed, and the ground plane acts as the conductive layer. When a conductive substrate is employed, the substrate can act as the conductive layer, although a conductive ground plane may also be provided.

If an electrically conductive ground plane is used, it is positioned over the substrate. Suitable materials for the electrically conductive ground plane include, but are not limited to, aluminum, zirconium, niobium, tantalum, vanadium, hafnium, titanium, nickel, stainless steel, chromium, tungsten, molybdenum, copper, and the like, and mixtures and alloys thereof. In embodiments, aluminum, titanium, and zirconium are preferred.

The ground plane can be applied by known coating techniques, such as solution coating, vapor deposition, and sputtering. A method of applying an electrically conductive ground plane is by vacuum deposition. Other suitable methods can also be used.

Preferred thicknesses of the ground plane are within a substantially wide range, depending on the optical transparency and flexibility desired for the electrophotoconductive member. Accordingly, for a flexible photoresponsive imaging device, the thickness of the conductive layer is preferably between about 20 angstroms and about 750 angstroms; more preferably, from about 50 angstroms to about 200 angstroms for an optimum combination of electrical conductivity, flexibility, and light transmission. However, the ground plane can, if desired, be opaque.

The Charge Blocking Layer

After deposition of any electrically conductive ground plane layer, a charge blocking layer 4 can be applied thereto. Electron blocking layers for positively charged photoreceptors permit holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer can be utilized.

If a blocking layer is employed, it is preferably positioned over the electrically conductive layer. The term "over," as used herein in connection with many different types of layers, should be understood as not being limited to instances wherein the layers are contiguous. Rather, the term refers to relative placement of the layers and encompasses the inclusion of unspecified intermediate layers.

The blocking layer 4 can include polymers such as polyvinyl butyral, epoxy resins, polyesters, polysiloxanes, polyamides, polyurethanes, and the like; nitrogen-containing siloxanes or nitrogen-containing titanium compounds, such as trimethoxysilyl propyl ethylene diamine, N-beta(aminoethyl) gamma-aminopropyl trimethoxy silane, isopropyl 4-aminobenzene sulfonyl titanate, di(dodecylbenezene sulfonyl)titanate, isopropyl di(4-aminobenzoyl)isostearoyl titanate, isopropyl tri(N-ethyl amino)titanate, isopropyl trianthranil titanate, isopropyl tri(N,N-dimethyl-ethyl amino)titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033, and 4,291,110.

The blocking layer should be continuous and can have a thickness ranging for example from about 0.01 to about 10 micrometers, preferably from about 0.05 to about 5 micrometers.

The blocking layer 4 can be applied by any suitable technique, such as spraying, dip coating, draw bar coating, gravure coating, silk screening, air knife coating, reverse roll coating, vacuum deposition, chemical treatment, and the like. For convenience in obtaining thin layers, the blocking layer is preferably applied in the form of a dilute solution, with the solvent being removed after deposition of the coating by conventional techniques, such as by vacuum, heating, and the like. Generally, a weight ratio of blocking layer material and solvent of between about 0.5:100 to about 30:100 is satisfactory for spray and dip coating.

The present embodiments further provide a method for forming the electrophotographic photoreceptor, in which the charge blocking layer is formed by using a coating solution composed of the grain shaped particles, the needle shaped particles, the binder resin and an organic solvent.

The organic solvent may be a mixture of an azeotropic mixture of $C_{1-3}$ lower alcohol and another organic solvent selected from the group consisting of dichloromethane, chloroform, 1,2-dichloroethane, 1,2-dichloropropane, toluene and tetrahydrofuran. The azeotropic mixture mentioned above is a mixture solution in which a composition of the liquid phase and a composition of the vapor phase are coincided with each other at a certain pressure to give a mixture having a constant boiling point. For example, a mixture consisted of 35 parts by weight of methanol and 65 parts by weight of 1,2-dichloroethane is an azeotropic solution. The azeotropic composition leads to uniform evaporation, thereby forming a uniform charge blocking layer without coating defects and improving storage stability of the charge blocking coating solution.

The binder resin contained in the blocking layer may be formed of the same materials as that of the blocking layer formed as a single resin layer. Among them, polyamide resin is preferably used because it satisfies various conditions required of the binder resin such as (i) polyamide resin is neither dissolved nor swollen in a solution used for forming the imaging layer on the blocking layer, and (ii) polyamide resin has an excellent adhesiveness with a conductive support as well as flexibility. In the polyamide resin, alcohol soluble nylon resin is most preferable, for example, copolymer nylon polymerized with 6-nylon, 6,6-nylon, 610-nylon, 11-nylon, 12-nylon and the like; and nylon which is chemically denatured such as N-alkoxy methyl denatured nylon and N-alkoxy ethyl denatured nylon. Another type of binder resin that may be used is a phenolic resin or polyvinyl butyral resin.

The charge blocking layer is formed by dispersing the binder resin, the grain shaped particles, and the needle shaped particles in the solvent to form a coating solution for the blocking layer; coating the conductive support with the coating solution and drying it. The solvent is selected for improving dispersion in the solvent and for preventing the coating solution from gelation with the elapse of time. Further, the azeotropic solvent may be used for preventing the composition of the coating solution from being changed as time passes, whereby storage stability of the coating solution can be improved and the coating solution can be reproduced.

The phrase "n-type" refers to materials which predominately transport electrons. Typical n-type materials include dibromoanthanthrone, benzimidazole perylene, zinc oxide, titanium oxide, azo compounds such as chlorodiane Blue and bisazo pigments, substituted 2,4-dibromotriazines, polynuclear aromatic quinones, zinc sulfide, and the like.

The phrase "p-type" refers to materials which transport holes. Typical p-type organic pigments include, for example, metal-free phthalocyanine, titanyl phthalocyanine, gallium phthalocyanine, hydroxy gallium phthalocyanine, chlorogallium phthalocyanine, copper phthalocyanine, and the like.

The Adhesive Layer

An intermediate layer 5 between the blocking layer and the charge generating layer may, if desired, be provided to promote adhesion. However, in the present embodiments, a dip coated aluminum drum may be utilized without an adhesive layer.

Additionally, adhesive layers can be provided, if necessary, between any of the layers in the photoreceptors to ensure adhesion of any adjacent layers. Alternatively, or in addition, adhesive material can be incorporated into one or both of the respective layers to be adhered. Such optional adhesive layers preferably have thicknesses of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, for example, film-forming polymers, such as polyester, dupont 49,000 (available from E. I. duPont de Nemours & Co.), Vitel PE-100 (available from Goodyear Tire and Rubber Co.), polyvinyl butyral, polyvinyl pyrrolidone, polyurethane, polymethyl methacrylate, and the like. The adhesive layer may be composed of a polyester with a $M_w$ of from about 50,000 to about 100,000, and preferably about 70,000, and a $M_n$ of preferably about 35,000.

The Imaging Layer(s)

The imaging layer refers to a layer or layers containing charge generating material, charge transport material, or both the charge generating material and the charge transport material.

Either a n-type or a p-type charge generating material can be employed in the present photoreceptor.

In the case where the charge generating material and the charge transport material are in different layers—for example a charge generation layer and a charge transport layer—the charge transport layer may comprise an electroactive COF particle. Further, in the case where the charge generating material and the charge transport material are in the same layer, this layer may comprise an electroactive COF particle.

Charge Generation Layer

Illustrative organic photoconductive charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments such as benzimidazole perylene; indigo pigments such as indigo, thioindigo, and the like; bisbenzoimidazole pigments such as Indofast Orange, and the like; phthalocyanine pigments such as copper phthalocyanine, aluminochloro-phthalocyanine, hydroxygallium phthalocyanine, chlorogallium phthalocyanine, titanyl phthalocyanine and the like; quinacridone pigments; or azulene compounds. Suitable inorganic photoconductive charge generating materials include for example cadium sulfide, cadmium sulfoselenide, cadmium selenide, crystalline and amorphous selenium, lead oxide and other chalcogenides. In embodiments, alloys of selenium may be used and include for instance selenium-arsenic, selenium-tellurium-arsenic, and selenium-tellurium.

Any suitable inactive resin binder material may be employed in the charge generating layer. Typical organic resinous binders include polycarbonates, acrylate polymers, methacrylate polymers, vinyl polymers, cellulose polymers, polyesters, polysiloxanes, polyamides, polyurethanes, epoxies, polyvinylacetals, and the like.

To create a dispersion useful as a coating composition, a solvent is used with the charge generating material. The solvent can be for example cyclohexanone, methyl ethyl ketone, tetrahydrofuran, alkyl acetate, and mixtures thereof. The alkyl acetate (such as butyl acetate and amyl acetate) can have from 3 to 5 carbon atoms in the alkyl group. The amount of solvent in the composition ranges for example from about 70 percent to about 98 percent by weight, based on the weight of the composition.

The amount of the charge generating material in the composition ranges for example from about 0.5 percent to about 30 percent by weight, based on the weight of the composition including a solvent. The amount of photoconductive particles (i.e, the charge generating material) dispersed in a dried photoconductive coating varies to some extent with the specific photoconductive pigment particles selected. For example, when phthalocyanine organic pigments such as titanyl phthalocyanine and metal-free phthalocyanine are utilized, satisfactory results are achieved when the dried photoconductive coating comprises between about 30 percent by weight and about 90 percent by weight of all phthalocyanine pigments based on the total weight of the dried photoconductive coating. Since the photoconductive characteristics are affected by the relative amount of pigment per square centimeter coated, a lower pigment loading may be utilized if the dried photoconductive coating layer is thicker. Conversely, higher pigment loadings are desirable where the dried photoconductive layer is to be thinner.

Generally, satisfactory results are achieved with an average photoconductive particle size of less than about 0.6 micrometer when the photoconductive coating is applied by dip coating. Preferably, the average photoconductive particle size is less than about 0.4 micrometer. Preferably, the photoconductive particle size is also less than the thickness of the dried photoconductive coating in which it is dispersed.

In a charge generating layer, the weight ratio of the charge generating material ("CGM") to the binder ranges from 30 (CGM):70 (binder) to 70 (CGM):30 (binder).

For multilayered photoreceptors comprising a charge generating layer (also referred herein as a photoconductive layer) and a charge transport layer, satisfactory results may be achieved with a dried photoconductive layer coating thickness of between about 0.1 micrometer and about 10 micrometers. Preferably, the photoconductive layer thickness is between about 0.2 micrometer and about 4 micrometers. However, these thicknesses also depend upon the pigment loading. Thus, higher pigment loadings permit the use of thinner photoconductive coatings. Thicknesses outside these ranges can be selected providing the objectives of the present embodiments are achieved.

Any suitable technique may be utilized to disperse the photoconductive particles in the binder and solvent of the coating composition. Typical dispersion techniques include, for example, ball milling, roll milling, milling in vertical attritors, sand milling, and the like. Typical milling times using a ball roll mill is between about 4 and about 6 days.

Charge transport materials include an organic polymer, a non-polymeric material, or a COF particle capable of supporting the injection of photo-excited holes or transporting electrons from the photoconductive material and allowing the transport of these holes or electrons through the organic layer to selectively dissipate a surface charge.

Organic Polymer Charge Transport Layer

Illustrative charge transport materials include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methyl pyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly(N-vinylcarbazole); poly(vinylpyrene); poly(vinyltetraphene); poly(vinyltetracene) and poly(vinylperylene). Suitable electron transport materials include electron acceptors such as 2,4,7-trinitro-9-fluorenone; tetranitro-fluorenone; dinitroanthracene; dinitroacridene; tetracyanopyrene; dinitroanthraquinone; and butylcarbonylfluorenemalononitrile, reference U.S. Pat. No. 4,921,769. Other hole transporting materials include arylamines described in U.S. Pat. No. 4,265,990, such as N,N'-diphenyl-N,N'-bis(alkylphenyl)-(1,1'-biphenyl)-4,4'-diamine wherein alkyl is selected from the group consisting of methyl, ethyl, propyl, butyl, hexyl, and the like. Other known charge transport layer molecules can be selected, reference for example U.S. Pat. Nos. 4,921,773 and 4,464,450.

Any suitable inactive resin binder may be employed in the charge transport layer. Typical inactive resin binders soluble in methylene chloride include polycarbonate resin, polyvinylcarbazole, polyester, polyarylate, polystyrene, polyacrylate, polyether, polysulfone, and the like. Molecular weights can vary from about 20,000 to about 1,500,000.

In a charge transport layer, the weight ratio of the charge transport material ("CTM") to the binder ranges from 30 (CTM):70 (binder) to 70 (CTM):30 (binder).

Any suitable technique may be utilized to apply the charge transport layer and the charge generating layer to the substrate. Typical coating techniques include dip coating, roll coating, spray coating, rotary atomizers, and the like. The coating techniques may use a wide concentration of solids. Preferably, the solids content is between about 2 percent by weight and 30 percent by weight based on the total weight of the dispersion. The expression "solids" refers to the charge transport particles and binder components of the charge transport coating dispersion. These solids concentrations are useful in dip coating, roll, spray coating, and the like. Generally, a more concentrated coating dispersion is preferred for roll coating. Drying of the deposited coating may be effected by any suitable conventional technique such as oven drying, infra-red radiation drying, air drying and the like. Generally, the thickness of the transport layer is between about 5 micrometers to about 100 micrometers, but thicknesses outside these ranges can also be used. In general, the ratio of the thickness of the charge transport layer to the charge generating layer is preferably maintained from about 2:1 to 200:1 and in some instances as great as 400:1.

COF Particle Charge Transport Layer

A large class of organic electronic films and materials are composite materials. In xerography, for example, these materials include pigments in polymers as charge generation layers, charge transport molecules in polymers as charge transport layers, and polytetrafluoroethylene (PTFE) particles in charge transport layers to change mechanical properties. To date, there are no reports of charge transport particles used as charge transport materials or to modify the mechanical properties of an organic electronic film or material. Thus, the present embodiments provide an inventive charge transport particle with added functionality that may be incorporated into various electronic devices to change mechanical properties. In one embodiment, there is provided an inventive photoreceptor comprising a charge transport layer that includes the COF particle as a charge transport material.

In the present embodiments, new charge transport particles compositions have been prepared and included in charge transport layers to provide improved properties. The COF particles are related to structured organic films such that they are prepared from the same molecular building blocks but a different process is used to prepare the particles instead of a film. The particles can be used as charge transport materials in organic electronic layers (xerographic, solar cell, OLED, TFT) and/or as additives to alter the mechanical properties of an organic electronic film or material. In further embodiments, the charge transport particles can be used in organic electronic device layers to alter the electrical performance of the layer and/or the mechanical properties of the layer (e.g., surface roughness, wear rate, and/or cleanability).

Figure 4:
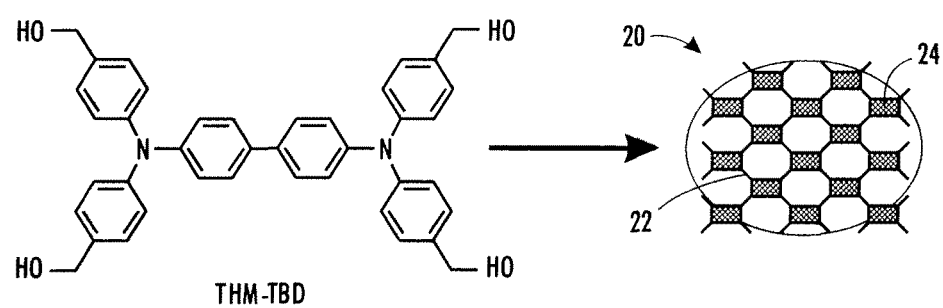
FIG. 4 represents the reaction of the molecular building blocks to form the COF particle according to the present embodiments.

These nanometer to millimeter-sized particles are patterned in two- or three-dimensions and constructed from hole transport or electron transport molecules. As shown in FIG. 4, the charge transport particle 20 is prepared from charge transport molecule building blocks which are charge transport moieties 24 connected together. The constituent charge transport moieties 24 are connected through covalent bonds 22 leading to mechanically robust, thermally stable particles 20.

In embodiments, the charge transport particle is present in the charge transport layer in an amount of from about 1 percent to about 25 percent, or from about 3 percent to about 12 percent by weight of the charge transport layer.

The charge transport particles are unique compositions that, when used as a charge transport material or additive in a binder, can alter the electrical and/or mechanical properties of a film or material. For example, these particles may be used in photoreceptor layers to change surface morphology, wear rate, and/or cleanability. Moreover, the patterned, 2- and/or 3-dimensional charge transport particles are robust and thermally stable. For example, the particles are thermally stable in air above 200° C. Modification of the charge transport particles can be accessed through a change in the molecular building blocks.

In a specific embodiment, the molecular building blocks used to create the COF particles are N,N,N',N'-tetrakis-[(4-hydroxymethyl)phenyl]-biphenyl-4,4'-diamine. In further embodiments the molecular building blocks can be selected from triarylamine segments being represented by the following general formula

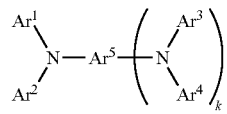

wherein $Ar^1$, $Ar^2$, $Ar^3$, $Ar^4$ and $Ar^5$ each independently represents a substituted or unsubstituted aryl group, or $Ar^5$ independently represents a substituted or unsubstituted arylene group, and k represents 0 or 1, wherein at least two of $Ar^1$, $Ar^2$, $Ar^3$ and $Ar^4$ comprises functional groups. Illustrative charge transport COF particles may include for example a positive hole transporting material selected from compounds having a segment containing a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport COF particle segments include electron donor materials, such as carbazole; N-ethyl carbazole; N-isopropyl carbazole; N-phenyl carbazole; tetraphenylpyrene; 1-methyl pyrene; perylene; chrysene; anthracene; tetraphene; 2-phenyl naphthalene; azopyrene; 1-ethyl pyrene; acetyl pyrene; 2,3-benzochrysene; 2,4-benzopyrene; and 1,4-bromopyrene. Suitable electron transport COF particle segments include electron acceptors such as 2,4,7-trinitro-9-fluorenone; 2,4,5,7-tetranitro-fluorenone; dinitroanthracene; dinitroacridene; tetracyanopyrene; dinitroanthraquinone; and butylcarbonylfluorenemalononitrile, reference U.S. Pat. No. 4,921,769. Other hole transporting COF particle segments include arylamines described in U.S. Pat. No. 4,265,990, such as N,N'-diphenyl-N,N'-bis(alkylphenyl)-(1,1'-biphenyl)-4,4'-diamine wherein alkyl is selected from the group consisting of methyl, ethyl, propyl, butyl, hexyl, and the like. In embodiments, the charge transport particle may comprise two or more types of molecular building block.

In embodiments, the charge transport particles may have high charge transport moiety loadings, for example, about greater than 95 percent charge transport moiety loadings. In more general embodiments, the charge transport moiety may range from about 5 percent to about 100 percent. The particle sizes may be prepared to be from about 5 nanometers to about 1 millimeter either by milling larger particles or directly by synthesis.

The COF particle charge transport layer can be prepared by: adding 0.6 gram of a charge transport particle (prepared as described in the section below), 5.28 grams of CYMEL® 303 (a methylated, butylated melamine-formaldehyde obtained from Cytec Industries Inc.), 5.88 grams of N,N'-diphenyl-N, N'-bis(3-hydroxyphenyl)-[1,1'-biphenyl]-4,4'-diamine, 0.48 gram of BYK-SILCLEAN® 3700 (a hydroxylated silicone modified polyacrylate obtained from BYK-Chemie USA), and 0.6 gram of NACURE® XP357 (a blocked acid catalyst obtained from King Industries) in 28 grams of DOWANOL® PM (1-methoxy-2-propanol obtained from the Dow Chemical Company). The overcoating layer solution can be applied on top of the charge transport layer, and dried at 155° C. for 40 minutes.

Single Layer P/R—Organic Polymer

The materials and procedures described herein can be used to fabricate a single imaging layer type photoreceptor containing a binder, a charge generating material, and a charge transport material. For example, the solids content in the dispersion for the single imaging layer may range from about 2 percent to about 30 percent by weight, based on the weight of the dispersion.

Where the imaging layer is a single layer combining the functions of the charge generating layer and the charge transport layer, illustrative amounts of the components contained therein are as follows: charge generating material (about 5 percent to about 40 percent by weight), charge transport material (about 20 percent to about 60 percent by weight), and binder (the balance of the imaging layer).

Single Layer P/R—COF Particle

The materials and procedures described herein can be used to fabricate a single imaging layer type photoreceptor containing a charge generating material, a charge transport material, and a charge transport COF particle. For example, the solids content in the dispersion for the single imaging layer may range from about 2 percent to about 30 percent by weight, based on the weight of the dispersion.

Where the imaging layer is a single layer combining the functions of the charge generating layer and the charge transport layer, illustrative amounts of the components contained therein are as follows: charge generating material (about 2 percent to about 40 percent by weight) a charge transport material (about 20 percent to 95 percent by weight), and charge transport particles with an inclined added functionality of charge transport molecular building block (about 1 percent to about 20 percent by weight).

The Overcoating Layer

Embodiments in accordance with the present embodiments can, optionally, further include an overcoating layer or layers 8, which, if employed, are positioned over the charge generation layer or over the charge transport layer. This layer comprises charge transport materials and may include COF particles.

In embodiments, the charge transport particles are present in the overcoat layer in an amount of from about 1 percent to about 25 percent by weight of the overcoat layer. In specific embodiments, the overcoat layer comprises COF particles which are present in the overcoat layer in an amount of from about 3 percent to about 15 percent by weight of the overcoat layer. Such a protective overcoating layer includes a charge transport material, a crosslinking agent, a catalyst, and optionally a polymeric binder. Additives may be present in the overcoating layer in the range of about 0.5 to about 40 weight percent of the overcoating layer. Preferred additives include organic and inorganic particles which can further improve the wear resistance and/or provide charge relaxation property. Preferred organic particles include Teflon powder, carbon black, and graphite particles. Preferred inorganic particles include insulating and semiconducting metal oxide particles such as silica, zinc oxide, tin oxide and the like. Another semiconducting additive is the oxidized oligomer salts as described in U.S. Pat. No. 5,853,906. The preferred oligomer salts are oxidized N,N,N',N'-tetra-p-tolyl-4,4'-biphenyl-diamine salt.

The deposition of the reaction mixture as a wet layer can be achieved by any suitable conventional technique and applied by any of a number of application methods. Typical application methods include, for example, hand coating, spray coating, web coating, dip coating and the like. Promoting the change of the wet film to the overcoating layer can be affected by any suitable conventional techniques, such as oven drying, infrared radiation drying, air drying, and the like.

Overcoating layers from about 2 micrometers to about 15 and from about 3 micrometers to about 8 micrometers are effective in preventing charge transport molecule leaching, crystallization, and charge transport layer cracking in addition to providing scratch and wear resistance.

The Ground Strip

Ground strip 9 can comprise a film-forming binder and electrically conductive particles. Cellulose may be used to disperse the conductive particles. Any suitable electrically conductive particles can be used in the electrically conductive ground strip layer 8. The ground strip 8 can, for example, comprise materials that include those enumerated in U.S. Pat. No. 4,664,995. Typical electrically conductive particles include, but are not limited to, carbon black, graphite, copper, silver, gold, nickel, tantalum, chromium, zirconium, vanadium, niobium, indium tin oxide, and the like.

The electrically conductive particles can have any suitable shape. Typical shapes include irregular, granular, spherical, elliptical, cubic, flake, filament, and the like. Preferably, the electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles through the matrix of the dried ground strip layer. Concentration of the conductive particles to be used in the ground strip depends on factors such as the conductivity of the specific conductive materials utilized.

In embodiments, the ground strip layer may have a thickness of from about 7 micrometers to about 42 micrometers and, preferably, from about 14 micrometers to about 27 micrometers.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example I

Preparation of Charge Transport Particles

The single molecular building block N,N,N',N'-tetrakis-[(4-hydroxymethyl)phenyl]-biphenyl-4,4'-diamine 24 forms the charge transport particle 20 as depicted in FIG. 4. The process for preparing the particle is dissolving N,N,N',N'-tetrakis-[(4-hydroxymethyl)phenyl]-biphenyl-4,4'-diamine, dowanol solvent, acid catalyst (Nacure 5225). The acid catalyzed reaction between the alcohol (—OH) groups links building blocks together through the formation of (linking) ether groups.

To a 10 dram vial was added 2 g of a formulation containing N,N,N',N'-tetrakis-[(4-hydroxymethyl)phenyl]-biphenyl-4,4'-diamine (20 wt percent), Nacure 5225 (1 wt percent), and dowanol (79 wt percent) (8 repeats were generated, for a total formulation mass of 16 g). These vials were capped tightly and placed in a 120° C. oven. After heating for 30 min a solution remains but color has changed from amber to dark brown. After heating for 120 min a singular dark brown particle formed in the bottom of each vial. After a further 60 min of heating no further change observed. Stopped heating. For each vial the solvent was decanted and the solid washed with dowanol (2×2 mL). The particles were removed from the vial and combined. The combined particles were dried in a 120° C. oven overnight. After 1 h of drying the color of the particles darkened to a black-brown color.

Following morning the particles were ground using a coffee mill and the sized reduced to 0.5-1 mm. This is the smallest size attainable using this method. X-ray diffraction showed the particles had no periodicity. The size of the particles was further reduced by ball milling for 2.5 h and the particles were isolated from steel shot by suspending in $Et_2O$ followed by solvent removal (isolated mass=3 g).

Characterization of Charge Transport Particles

Figure 5A:
FIG. 5A illustrates COF particle morphology after grinding according to the present embodiments.
Figure 5B:
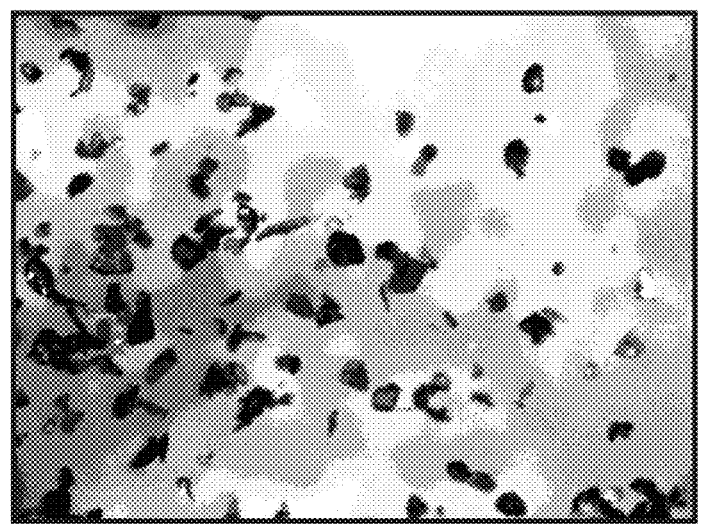
FIG. 5B illustrates COF particle morphology after milling according to the present embodiments.

Optical microscopy showed the particle size distribution was somewhat bimodal, with average particle sizes centered around 8 and 1 micron. Particle morphology was roughly spherical to needle-like. Needle-like morphology was biased toward smaller particle size. FIGS. 5A and 5B show particle morphology after grinding and milling, respectively.

Figure 6:
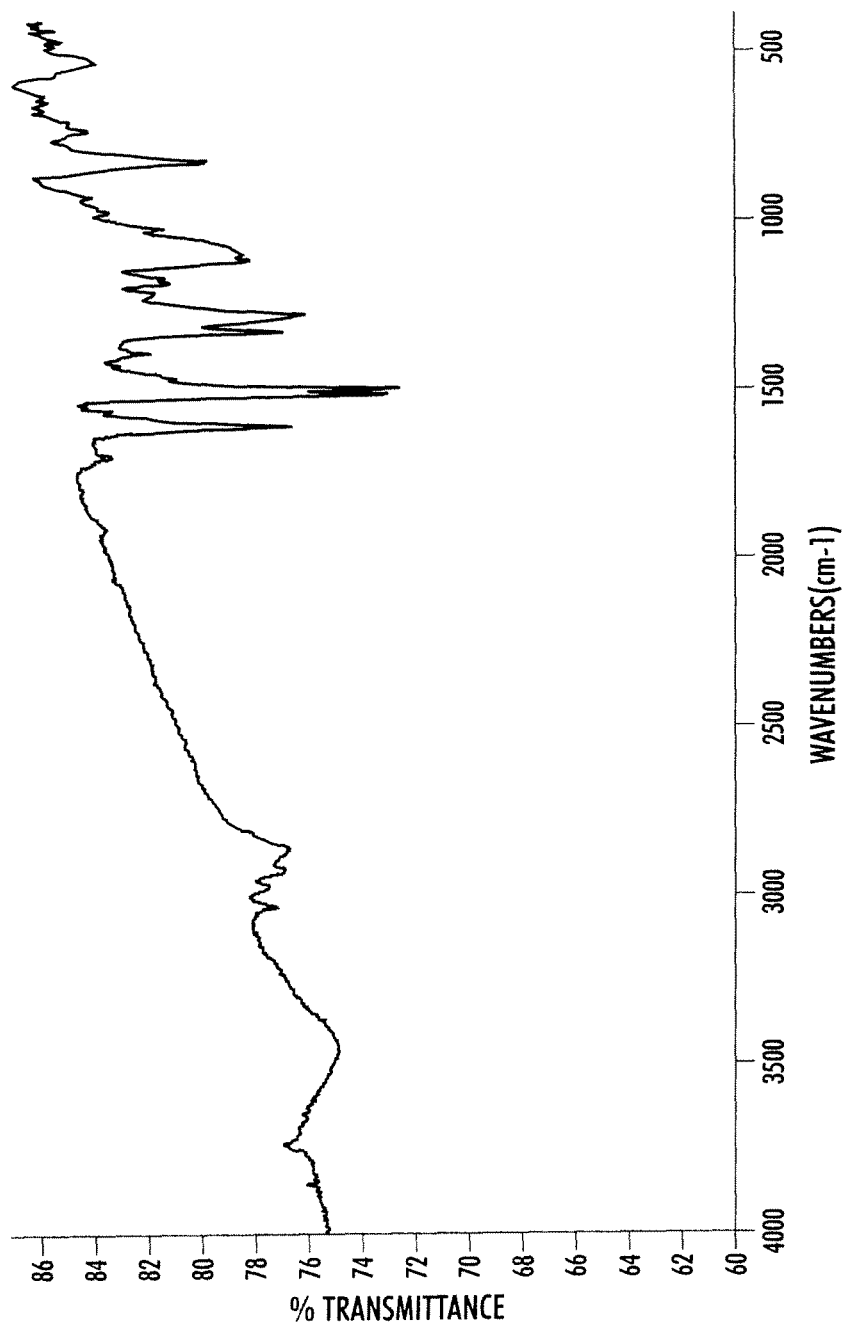
FIG. 6 illustrates Fourier transform infrared spectrum of a particle with N,N,N',N'-tetraphenyl)-biphenyl-4,4'-diamine segments according to the present embodiments.

An infrared (IR) spectrum of the particle containing N,N,N',N'-tetraphenyl-biphenyl-4,4'-diamine segments (KBr pellet), represented by FIG. 6, had a broad peak at 3400 cm-1 indicating there was residual solvent present in the particle and/or incomplete reaction of the hydroxyl groups of the N,N,N',N'-tetrakis-[(4-hydroxymethyl)phenyl]-biphenyl-4,4'-diamine.

Figure 7:
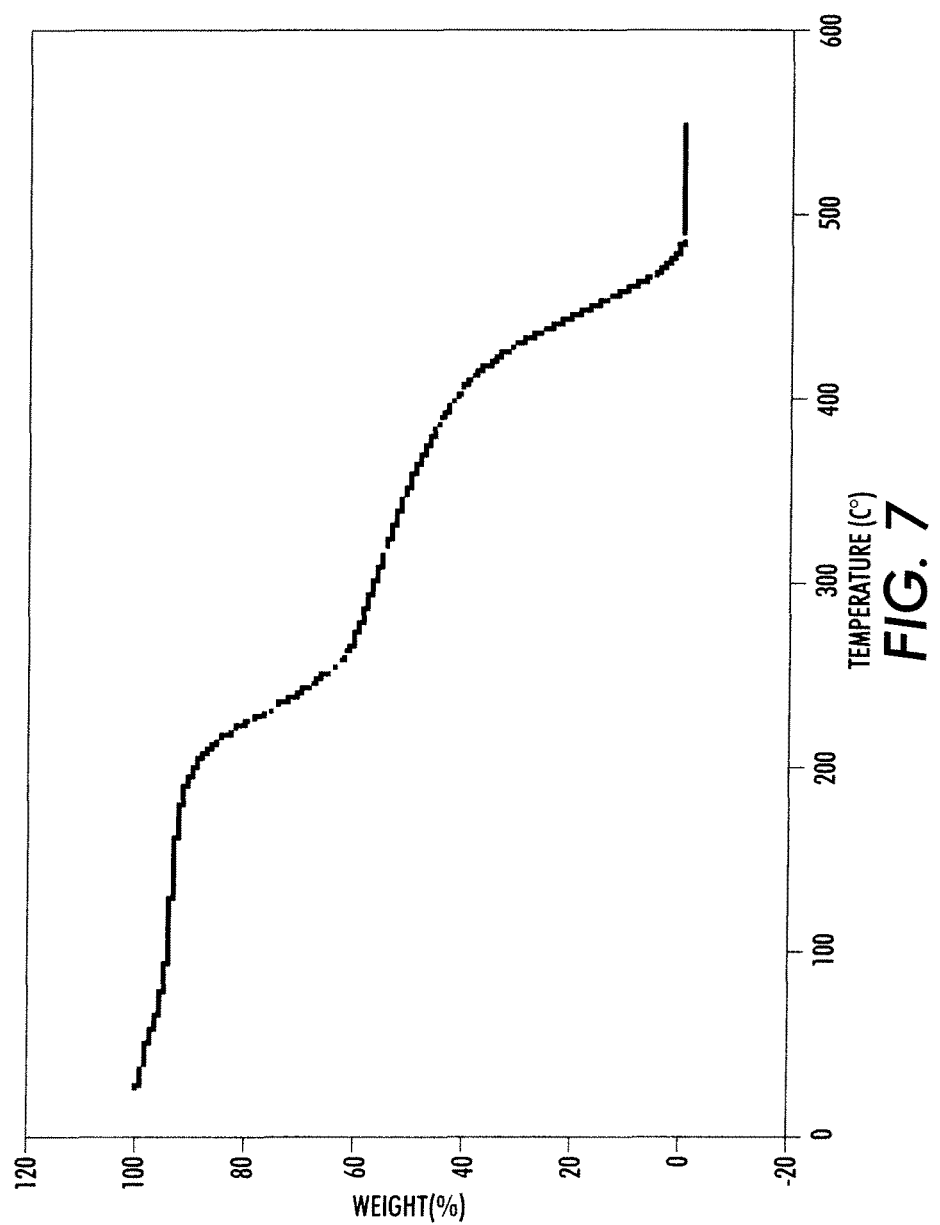
FIG. 7 illustrates a TGA thermogram illustrating the robustness at high heat of a charge transport particle according to the present embodiments.

FIG. 7 represents a TGA thermogram of the particle containing N,N,N',N'-tetraphenyl-biphenyl-4,4'-diamine segments illustrating the thermal robustness in air to temperature to over 200° C.

Summary of Results

Charge transport particles are unique compositions that can be used as charge transport additives in a binder to alter the electrical and/or mechanical properties of a film or material. These particles may be well-suited as additives in photoreceptor layers to change surface morphology, wear rate, and/or cleanability. Charge transport particles have been prepared from N,N,N',N'-tetrakis-[(4-hydroxymethyl)phenyl]-biphenyl-4,4'-diamine molecular building blocks with particle sizes on the order of millimeters and micrometers have been demonstrated (grinding and milling). These particles have proven robust, thermally stable particles.

It will be appreciated that several of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A charge transport particle comprising a plurality of segments and a plurality of linkers arranged as a covalent organic framework, wherein the charge transport particle has an added functionality of electron, hole, or ambipolar charge transport; wherein the segments are of only one type; wherein the linkers are of only one type selected from the group of ether, ester, carbonate, amide or imine.

2. The charge transport particle of claim 1, wherein the particle is non-porous.

3. The charge transport particle of claim 1, wherein the segments are selected from the group consisting of hole transport moieties, electron transport moieties, ambipolar charge transport moieties, and mixtures thereof.

4. The charge transport particle of claim 1, wherein the segments comprise a moiety of N,N,N',N'-tetraphenyl-biphenyl-4,4'-diamine.

5. The charge transport particle of claim 1, wherein the covalent organic framework is non-periodic.

6. The charge transport particle of claim 1 having a size of from about 5 nanometers to about 1 millimeter.

7. A charge transport particle comprising a plurality of segments and a plurality of linkers arranged as a covalent organic framework, wherein the segments comprise charge transport moieties, wherein the segments are of only one type, and further wherein the linkers are of only one type selected from the group of ether, ester, carbonate, amide or imine.

8. The charge transport particle of claim 7, wherein the charge transport moiety is selected from the group consisting of hole transport moieties, electron transport moieties, ambipolar moieties, and mixtures thereof.

9. The charge transport particle of claim 7 having a charge transport moiety loading of from about 5 percent to about 100 percent.

10. An electronic device comprising: a charge transport particle comprising a plurality of segments and a plurality of linkers arranged as a covalent organic framework, wherein the segments comprise charge transport moieties, wherein the segments are of only one type, and further wherein the linkers are of only one type selected from the group of ether, ester, carbonate, amide or imine.

11. The electronic device of claim 10, wherein the segments comprise a moiety of N,N,N',N'-tetraphenyl-biphenyl-4,4'-diamine.

12. The electronic device of claim 10 being a photoreceptor.

13. The electronic device of claim 12, wherein the photoreceptor further comprises:
a substrate; and
a single imaging layer disposed above the substrate, and further wherein the single imaging layer has both charge generating and charge transporting functions and the charge transport particle is present in the single imaging layer in an amount of from about 1 percent to about 25 percent by weight of the single imaging layer.

14. The electronic device of claim 12, wherein the photoreceptor further comprises:
a substrate;
a charge generation layer disposed above the substrate;
a charge transport layer disposed above the charge generation layer; and
an optional overcoat layer disposed above the charge transport layer, and further wherein the charge transport particle is present in at least one of the charge transport layer or overcoat layer in an amount of from about 1 percent to about 25 percent by weight of the respective layer.

* * * * *